US012793346B2

(12) United States Patent
Breitweiser

(10) Patent No.: US 12,793,346 B2
(45) Date of Patent: Nov. 10, 2026

(54) EXTENDED REALITY METHODS AND SYSTEMS FOR OBTAINING USER PREFERENCES

(71) Applicant: STATE FARM MUTUAL AUTOMOBILE INSURANCE COMPANY, Bloomington, IL (US)

(72) Inventor: Edward W. Breitweiser, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 93 days.

(21) Appl. No.: 18/111,212

(22) Filed: Feb. 17, 2023

(65) Prior Publication Data

US 2023/0267689 A1 Aug. 24, 2023

Related U.S. Application Data

(60) Provisional application No. 63/320,297, filed on Mar. 16, 2022, provisional application No. 63/320,270, (Continued)

(51) Int. Cl.
*G06T 19/00* (2011.01)
*G06F 3/01* (2006.01)
(Continued)

(52) U.S. Cl.
CPC ............ *G06T 19/003* (2013.01); *G06F 3/011* (2013.01); *G06Q 40/08* (2013.01); *G06Q 50/16* (2013.01);
(Continued)

(58) Field of Classification Search
None
See application file for complete search history.

(56) References Cited

U.S. PATENT DOCUMENTS 5,628,033 A 5/1997 Dilich et al.
8,954,226 B1 2/2015 Binion et al.
(Continued)

FOREIGN PATENT DOCUMENTS

CN 113705351 B 5/2024
EP 3239686 A1 11/2017
(Continued)

OTHER PUBLICATIONS

Golbeck et al., "Predicting Personality with Social Media", CHI EA '11: CHI '11 Extended Abstracts on Human Factors in Computing Systems, May 7, 2011, URL: https://dl.acm.org/doi/10.1145/1979742.1979614 (Year: 2011).*
(Continued)

*Primary Examiner* — David H Chu
(74) *Attorney, Agent, or Firm* — MARSHALL, GERSTEIN & BORUN LLP

(57) ABSTRACT

In a computer-implemented method, a first extended reality (XR) environment is presented using a first XR device associated with a person, and one or more user interfaces are provided in the first XR environment to the person. The method also includes receiving, from the person via the one or more user interfaces in the first XR environment, one or more preferences of the person.

15 Claims, 16 Drawing Sheets

Related U.S. Application Data filed on Mar. 16, 2022, provisional application No. 63/318,325, filed on Mar. 9, 2022, provisional application No. 63/311,591, filed on Feb. 18, 2022.

(51) Int. Cl.

| | |
|---|---|
| ***G06Q 40/08*** | (2012.01) |
| ***G06Q 50/16*** | (2012.01) |
| ***G06Q 50/163*** | (2024.01) |
| ***G06Q 50/18*** | (2012.01) |
| ***G06T 17/00*** | (2006.01) |
| ***G06V 20/20*** | (2022.01) |

(52) U.S. Cl.

CPC ......... *G06Q 50/163* (2013.01); *G06Q 50/186* (2013.01); *G06T 17/00* (2013.01); *G06V 20/20* (2022.01)

(56) References Cited

U.S. PATENT DOCUMENTS

| | | | | |
|---|---|---|---|---|
| 8,957,914 | B2 * | 2/2015 | Dolbier | A63F 13/60 709/204 |
| 9,324,173 | B2 * | 4/2016 | Castelli | G06T 13/40 |
| 9,691,189 | B1 | 6/2017 | Creath | |
| 9,830,748 | B2 | 11/2017 | Rosenbaum | |
| 9,886,841 | B1 | 2/2018 | Nave et al. | |
| 9,990,782 | B2 | 6/2018 | Rosenbaum | |
| 10,078,867 | B1 | 9/2018 | Chan et al. | |
| 10,134,084 | B1 * | 11/2018 | Gabriele | G06Q 20/208 |
| 10,210,577 | B1 | 2/2019 | Davis et al. | |
| 10,269,190 | B2 | 4/2019 | Rosenbaum | |
| 10,373,387 | B1 | 8/2019 | Fields et al. | |
| 10,467,824 | B2 | 11/2019 | Rosenbaum | |
| 10,510,054 | B1 | 12/2019 | Eidam et al. | |
| 10,515,486 | B1 | 12/2019 | Chavez et al. | |
| 10,616,278 | B1 | 4/2020 | Johansson et al. | |
| 10,636,211 | B1 | 4/2020 | Kuruvilla et al. | |
| 10,659,733 | B1 | 5/2020 | Goetzinger | |
| 10,685,400 | B1 | 6/2020 | Brandmaier et al. | |
| 10,692,050 | B2 | 6/2020 | Taliwal et al. | |
| 10,719,966 | B1 | 7/2020 | Davis et al. | |
| 10,748,340 | B1 | 8/2020 | Zhang et al. | |
| 10,824,867 | B1 | 11/2020 | Assam | |
| 10,956,981 | B1 | 3/2021 | Fields et al. | |
| 11,023,977 | B1 | 6/2021 | Khurana et al. | |
| 11,055,531 | B1 | 7/2021 | Maestas | |
| 11,113,768 | B1 | 9/2021 | Davis et al. | |
| 11,132,481 | B1 | 9/2021 | Davis et al. | |
| 11,138,757 | B2 | 10/2021 | Jovanovic et al. | |
| 11,164,356 | B1 | 11/2021 | Davis et al. | |
| 11,200,421 | B1 | 12/2021 | Chavez et al. | |
| 11,200,742 | B1 | 12/2021 | Post et al. | |
| 11,227,452 | B2 | 1/2022 | Rosenbaum | |
| 11,250,515 | B1 | 2/2022 | Feiteira et al. | |
| 11,250,631 | B1 | 2/2022 | Fields et al. | |
| 11,341,379 | B1 | 5/2022 | Bagheri et al. | |
| 11,361,383 | B1 | 6/2022 | James et al. | |
| 11,379,886 | B1 | 7/2022 | Fields et al. | |
| 11,380,148 | B2 | 7/2022 | Vijayan et al. | |
| 11,407,410 | B2 | 8/2022 | Rosenbaum | |
| 11,524,707 | B2 | 12/2022 | Rosenbaum | |
| 11,594,083 | B1 | 2/2023 | Rosenbaum | |
| 11,620,862 | B1 | 4/2023 | Serrao et al. | |
| 11,663,782 | B1 | 5/2023 | Post et al. | |
| 11,710,280 | B1 | 7/2023 | Durairaj et al. | |
| 11,776,142 | B2 | 10/2023 | Holzer et al. | |
| 11,798,235 | B1 | 10/2023 | Bhushan et al. | |
| 11,810,202 | B1 | 11/2023 | Little et al. | |
| 11,816,759 | B1 | 11/2023 | Smith et al. | |
| 11,823,337 | B2 | 11/2023 | Fields et al. | |
| 11,846,514 | B1 | 12/2023 | Kentley-Klay et al. | |
| 11,893,840 | B2 | 2/2024 | Cardona et al. | |
| 11,954,315 | B1 | 4/2024 | Megyese et al. | |
| 2002/0111946 | A1 | 8/2002 | Fallon | |
| 2003/0046003 | A1 | 3/2003 | Smith et al. | |
| 2003/0182290 | A1 | 9/2003 | Parker | |
| 2010/0063908 | A1 | 3/2010 | Racanelli et al. | |
| 2012/0116819 | A1 | 5/2012 | Hertenstein | |
| 2015/0029308 | A1 | 1/2015 | Han et al. | |
| 2015/0269856 | A1 * | 9/2015 | Kelson | G09B 5/12 434/350 |
| 2015/0294405 | A1 | 10/2015 | Hanson et al. | |
| 2016/0189310 | A1 | 6/2016 | O'Kane | |
| 2016/0253843 | A1 | 9/2016 | Lee | |
| 2017/0046806 | A1 | 2/2017 | Haldenby et al. | |
| 2017/0053461 | A1 | 2/2017 | Pal et al. | |
| 2017/0140484 | A1 | 5/2017 | Lete et al. | |
| 2017/0193533 | A1 * | 7/2017 | Lai | G06F 16/951 |
| 2017/0301028 | A1 * | 10/2017 | Strabel | G06F 16/24578 |
| 2018/0137585 | A1 | 5/2018 | Van Niekerk | |
| 2018/0139203 | A1 | 5/2018 | Dolan et al. | |
| 2018/0157336 | A1 | 6/2018 | Harris et al. | |
| 2018/0159838 | A1 | 6/2018 | Dintenfass | |
| 2018/0205546 | A1 | 7/2018 | Haque et al. | |
| 2018/0253670 | A1 * | 9/2018 | Sommer | G06Q 40/08 |
| 2019/0051046 | A1 | 2/2019 | Jin et al. | |
| 2019/0163741 | A1 * | 5/2019 | Buckwalter | G06F 16/9535 |
| 2019/0251750 | A1 | 8/2019 | Brewer et al. | |
| 2019/0266661 | A1 | 8/2019 | de Sousa Moura et al. | |
| 2019/0303463 | A1 | 10/2019 | Catalano et al. | |
| 2019/0318408 | A1 | 10/2019 | Chao et al. | |
| 2019/0318420 | A1 * | 10/2019 | Summerson | G06Q 40/03 |
| 2020/0005540 | A1 | 1/2020 | Challagolla et al. | |
| 2020/0058219 | A1 | 2/2020 | Hassani et al. | |
| 2020/0111264 | A1 | 4/2020 | Kuruvilla et al. | |
| 2020/0143481 | A1 | 5/2020 | Brown et al. | |
| 2020/0160345 | A1 | 5/2020 | Damania et al. | |
| 2020/0162246 | A1 | 5/2020 | Schouppe | |
| 2020/0175576 | A1 | 6/2020 | Born et al. | |
| 2020/0327743 | A1 | 10/2020 | Cannarsa | |
| 2020/0357204 | A1 | 11/2020 | Crequer et al. | |
| 2021/0042361 | A1 | 2/2021 | Leise et al. | |
| 2021/0166483 | A1 | 6/2021 | Kozloski et al. | |
| 2021/0225094 | A1 | 7/2021 | Salodkar et al. | |
| 2021/0279957 | A1 | 9/2021 | Eder et al. | |
| 2021/0304510 | A1 | 9/2021 | Rogers et al. | |
| 2021/0312710 | A1 | 10/2021 | Fathi et al. | |
| 2021/0322877 | A1 | 10/2021 | Chong | |
| 2021/0327008 | A1 | 10/2021 | Salah | |
| 2021/0350452 | A1 | 11/2021 | Nickerson et al. | |
| 2021/0373741 | A1 | 12/2021 | Agarawala et al. | |
| 2021/0383115 | A1 | 12/2021 | Alon et al. | |
| 2022/0058845 | A1 | 2/2022 | Davis et al. | |
| 2022/0070236 | A1 * | 3/2022 | Yerli | H04L 63/0861 |
| 2022/0075504 | A1 | 3/2022 | Little et al. | |
| 2022/0092893 | A1 | 3/2022 | Rosenbaum | |
| 2022/0130064 | A1 | 4/2022 | Tomar | |
| 2022/0155945 | A1 | 5/2022 | Holzer et al. | |
| 2022/0156497 | A1 | 5/2022 | Holzer et al. | |
| 2022/0157031 | A1 | 5/2022 | Fields et al. | |
| 2022/0182557 | A1 | 6/2022 | Martinez Pupo de Oliveira et al. | |
| 2022/0189075 | A1 | 6/2022 | Lynch et al. | |
| 2022/0191035 | A1 | 6/2022 | Tucker et al. | |
| 2022/0236787 | A1 | 7/2022 | Kamhi et al. | |
| 2022/0246036 | A1 | 8/2022 | Petersen et al. | |
| 2022/0254007 | A1 | 8/2022 | Holzer et al. | |
| 2022/0262518 | A1 | 8/2022 | Navani et al. | |
| 2022/0277321 | A1 * | 9/2022 | Trevino Rojas | G06Q 40/00 |
| 2022/0340148 | A1 | 10/2022 | Rosenbaum | |
| 2023/0060300 | A1 | 3/2023 | Rosenbaum | |
| 2023/0113765 | A1 | 4/2023 | Patt et al. | |
| 2023/0114918 | A1 | 4/2023 | Patt et al. | |
| 2023/0123698 | A1 * | 4/2023 | Ahn | A63F 13/79 709/206 |
| 2023/0135750 | A1 | 5/2023 | Spoerri | |
| 2023/0162420 | A1 * | 5/2023 | Le Chevalier | G06F 3/011 345/419 |
| 2023/0177776 | A1 * | 6/2023 | Bryant | G06F 3/017 345/633 |

(56) References Cited

U.S. PATENT DOCUMENTS

| | | | |
|---|---|---|---|
| 2023/0177777 | A1 | 6/2023 | Bryant et al. |
| 2023/0192087 | A1 | 6/2023 | Ludwig et al. |

FOREIGN PATENT DOCUMENTS

| | | | |
|---|---|---|---|
| EP | 3578433 | B1 | 8/2020 |
| EP | 3730375 | B1 | 10/2021 |
| EP | 3960576 | A1 | 3/2022 |
| EP | 4190659 | A1 | 6/2023 |
| EP | 4190660 | A1 | 6/2023 |
| GB | 2596137 | A | 12/2021 |

OTHER PUBLICATIONS

Wang et al., "Augmented Reality for Enhanced Visual Inspection Through Knowledge-Based Deep Learning." Structural Health Monitoring 20.1 (2021): 426-442 (Year 2021).

Smith, "How Financial Institutions are Utilizing AR and VR" accessed at: https://www.theglimpsegroup.com/news/glimpse-blog/how-financial-institutions-utilize-ar-vr (2021).

* cited by examiner

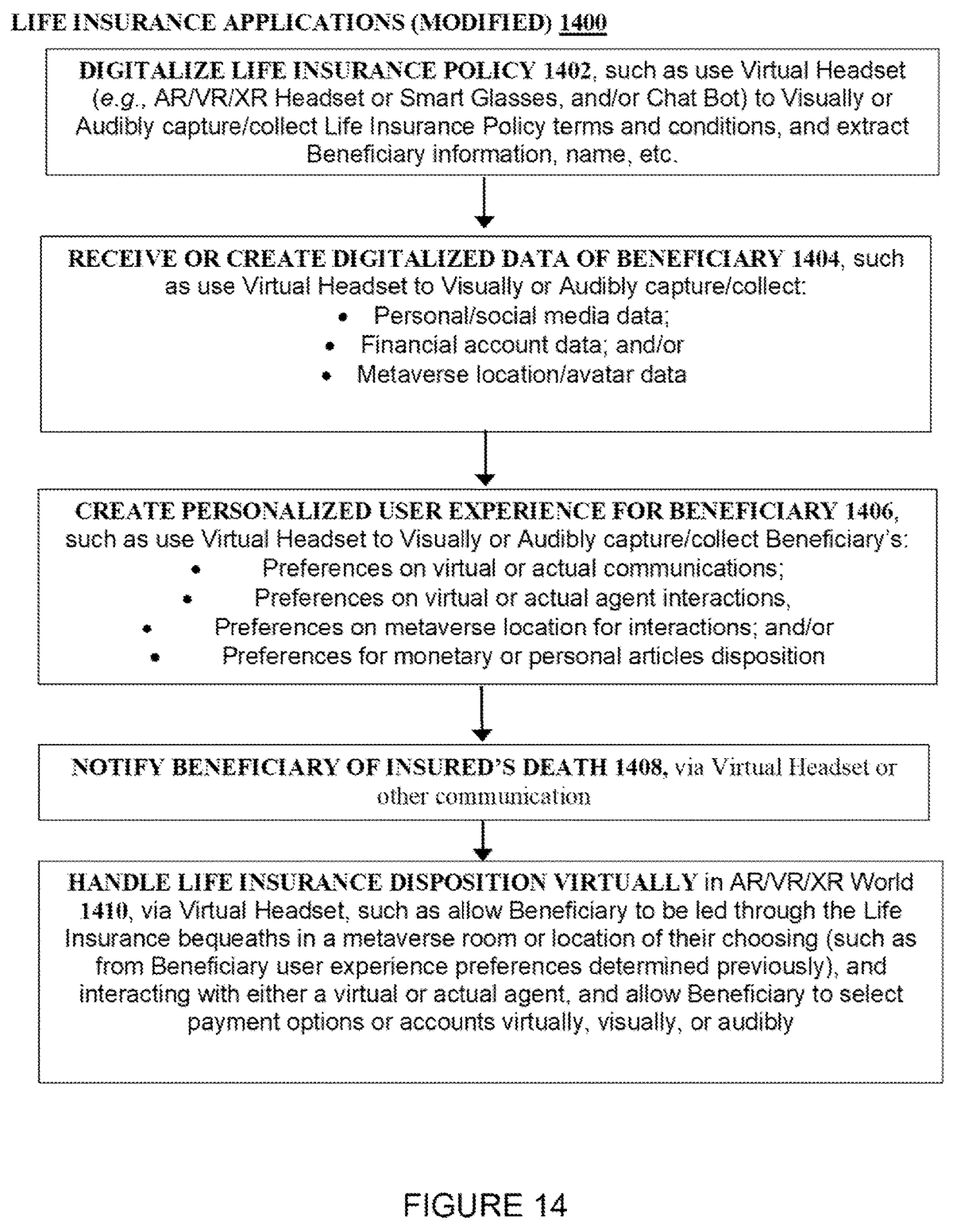

LIFE INSURANCE APPLICATIONS (MODIFIED) 1400

DIGITALIZE LIFE INSURANCE POLICY 1402, such as use Virtual Headset (*e.g.*, AR/VR/XR Headset or Smart Glasses, and/or Chat Bot) to Visually or Audibly capture/collect Life Insurance Policy terms and conditions, and extract Beneficiary information, name, etc.

↓

RECEIVE OR CREATE DIGITALIZED DATA OF BENEFICIARY 1404, such as use Virtual Headset to Visually or Audibly capture/collect:

- Personal/social media data;
- Financial account data; and/or
- Metaverse location/avatar data

↓

CREATE PERSONALIZED USER EXPERIENCE FOR BENEFICIARY 1406, such as use Virtual Headset to Visually or Audibly capture/collect Beneficiary's:

- Preferences on virtual or actual communications;
- Preferences on virtual or actual agent interactions,
- Preferences on metaverse location for interactions; and/or
- Preferences for monetary or personal articles disposition

↓

NOTIFY BENEFICIARY OF INSURED'S DEATH 1408, via Virtual Headset or other communication

↓

HANDLE LIFE INSURANCE DISPOSITION VIRTUALLY in AR/VR/XR World 1410, via Virtual Headset, such as allow Beneficiary to be led through the Life Insurance bequeaths in a metaverse room or location of their choosing (such as from Beneficiary user experience preferences determined previously), and interacting with either a virtual or actual agent, and allow Beneficiary to select payment options or accounts virtually, visually, or audibly

FIGURE 14

AUTO & HOMEOWNERS INSURANCE APPLICATIONS 1500

EXTENDED REALITY METHODS AND SYSTEMS FOR OBTAINING USER PREFERENCES

CROSS-REFERENCE TO RELATED APPLICATIONS

This application claims the benefit of: (1) U.S. Provisional Patent Application No. 63/311,591, entitled "Virtual Headset Applications & Personalized Virtual User Experiences" and filed on Feb. 18, 2022; (2) U.S. Provisional Patent Application No. 63/318,325, entitled "Extended Reality Methods and Systems for Processing Vehicle-Related Information" and filed on Mar. 9, 2022; (3) U.S. Provisional Patent Application No. 63/320,270, entitled "Extended Reality Methods and Systems for Obtaining and Handling Estate Data," and filed on Mar. 16, 2022; and (4) U.S. Provisional Patent Application No. 63/320,297, entitled "Extended Reality Methods and Systems for Collecting, Managing, and Using Home-Related Information," and filed on Mar. 16, 2022. The disclosure of each of the above-identified patent applications is hereby incorporated herein by reference in its entirety.

FIELD

The present disclosure generally relates to extended reality (XR), and, more particularly, (i) to creating preferred or personalized virtual user experiences, and/or (ii) to XR methods and systems for obtaining and handling estate data.

BACKGROUND

In commercial settings, conventional approaches to customer interactions (e.g., for collecting customer information and/or providing information to customers) have various drawbacks, such as inefficient or ineffective relaying of information, as well as an inability to collect complete and/or accurate datasets. The present embodiments may overcome these and/or other deficiencies.

BRIEF SUMMARY

Present embodiments include XR systems, XR devices, XR methods, and XR environments for obtaining and handling estate data. In some embodiments, the XR systems may include augmented reality (AR) systems, virtual reality (VR) systems, mixed reality (MR) systems, and/or smart glasses or smart contacts. The XR systems may be configured to generate, and provide or present personalized XR environments. Taken together, disclosed XR systems, XR devices, XR methods, and XR environments work together to provide a person with personalized XR experiences that they may use to provide or handle estate data.

In one aspect, a computer-implemented method includes: (1) presenting a first extended reality (XR) environment using a first XR device associated with a person; (2) providing, in the first XR environment, one or more user interfaces to the person; and/or (3) receiving, from the person via the one or more user interfaces in the first XR environment, one or more preferences of the person.

In another aspect, a system includes a communication interface, and one or more processors configured to: (1) present a first extended reality (XR) environment using a first XR device associated with a person; (2) provide, in the first XR environment via the communication interface, one or more user interfaces to the person; and/or (3) receive, from the person via the one or more user interfaces in the first XR environment via the communication interface, one or more preferences of the person.

In another aspect, a non-transitory computer-readable storage medium stores instructions that, when executed by one or more processors, cause a system to: (1) present a first extended reality (XR) environment using a first XR device associated with a person; (2) provide, in the first XR environment, one or more user interfaces to the person; and/or (3) receive, from the person via the one or more user interfaces in the first XR environment, one or more preferences of the person.

Advantages will become more apparent to those skilled in the art from the following description of the preferred embodiments, which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of exemplary XR systems, XR devices, XR environments, and XR methods disclosed therein. It should be understood that each Figure depicts embodiments of particular aspects of the disclosed XR systems, XR devices, XR environments, and XR methods, and that each of the Figures is intended to accord with one or more possible embodiments thereof. Alternative embodiments of the XR systems, XR devices, XR environments, and XR methods illustrated herein may be employed without departing from the principles of the invention described herein.

There are shown in the drawings arrangements which are presently discussed, it being understood, however, that the present embodiments are not limited to the precise arrangements and instrumentalities shown, wherein:

FIG. 14 illustrates another computer-implemented method utilizing a personalized virtual user experience to dispose of assets identified in a life insurance policy, will, or trust;

Figure 1:
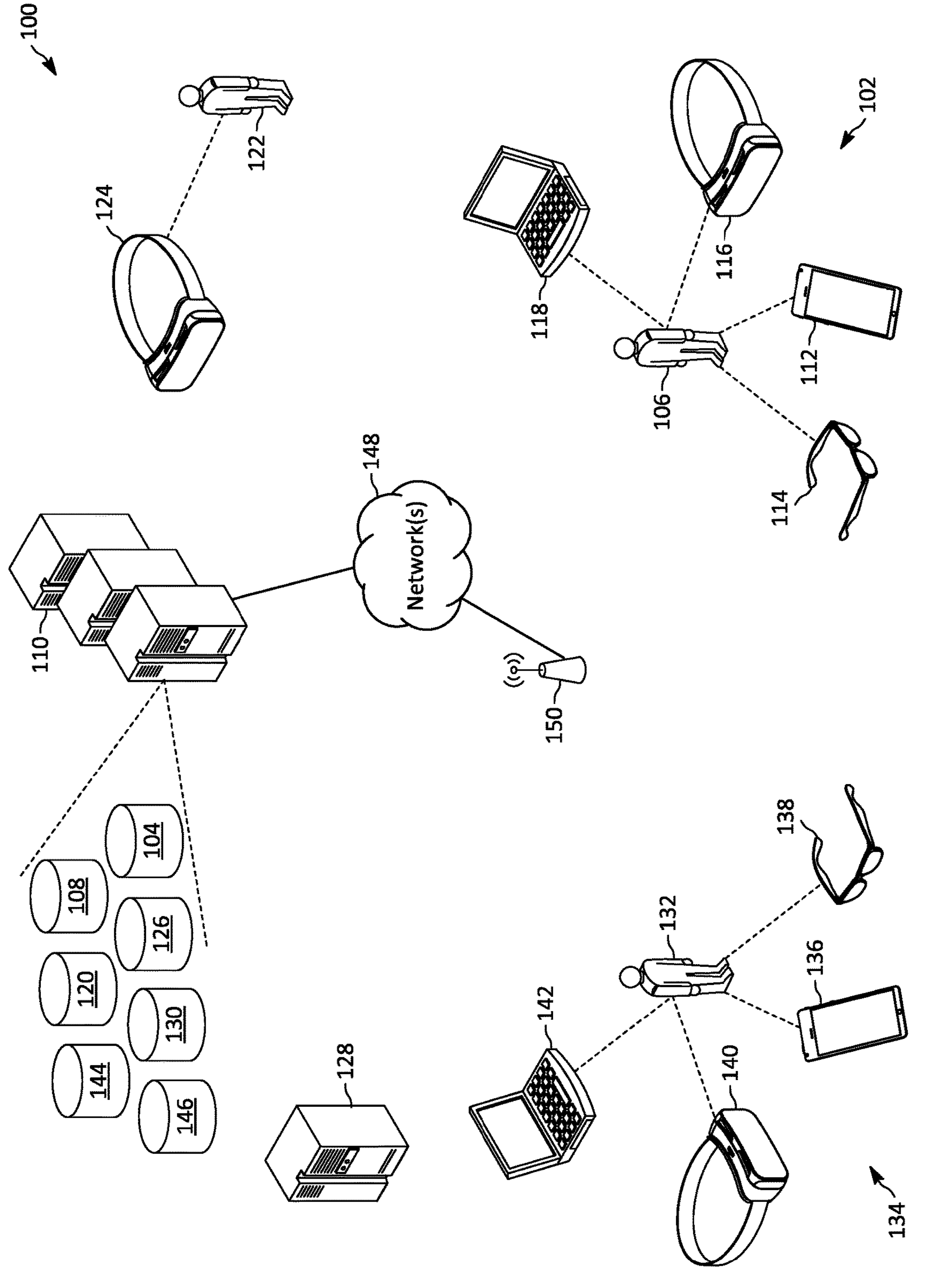
FIG. 1 is a schematic diagram of an exemplary XR system for obtaining and handling estate data, in accordance with various embodiments of the present disclosure.

Skilled artisans will appreciate that elements in the Figures are illustrated for simplicity and clarity, and have not necessarily been drawn to scale. For example, the dimensions of some of the elements in the Figures may be exaggerated relative to other elements to help to improve understanding. Moreover, apparatus and method components have been represented where appropriate by conventional symbols in the Figures, showing only those specific details that are pertinent to understanding the embodiments of the present disclosure so as not to obscure the present disclosure with details that will be readily apparent to those of ordinary skill in the art having the benefit of the description herein. Further, wherever possible, the following description refers to the reference numerals included in the following Figures, in which features depicted in multiple Figures are designated with consistent reference numerals.

DETAILED DESCRIPTION

The present embodiments relate, inter alia, to XR systems, XR devices, personalized XR environments (i.e., virtualized environments), methods, and/or user interfaces for (i) obtaining and/or providing personal data and/or XR preferences; (ii) generating XR environments in accordance with the XR preferences; (iii) obtaining and/or providing estate data related a person's assets using XR environments; and/or (iv) presenting and receiving selections of asset disposal options, and accordingly disposing of their assets upon death of the person using XR environments.

As used herein, the term "estate data" will refer to any number and/or type(s) of data or information that collectively represent, wholly or partially, one or more legal, financial, and/or other descriptive aspects of a person's estate. Estate data may include asset data associated with, and/or representing, assets of the estate. Estate data may also include legal documents, such as will, trusts, contracts, agreements, deeds, etc., that represent how one or more assets of the estate are to be disposed of, legally or financially, upon the death of the person. However, estate data may include any number and/or type(s) of other applicable data, information, documents, etc. Typically, the person plans for their eventual death by providing information and data that may be used to form, define, or generate the estate data representing their estate.

As used herein, the term "estate asset," or simply "asset," refers to any number and/or type(s) of tangible and/or intangible assets that belonged to a person while alive, and form or will form part of the person's estate upon their death. Example estate assets include, but are not limited to, (i) an insurance policy of any kind (e.g., life, disability, health, home, automobile, personal articles, business, etc.); (ii) a bank account; (iii) an investment account; (iv) a savings account; (v) a checking account; (vi) a belonging of any kind (e.g., household belongings, computing devices, clothing, jewelry, cars, boats, recreational vehicles, homes, apartments, condominiums, townhomes, property, etc.); (vii) a pension; (viii) social-security or other government benefits; (ix) a retirement savings account; (x) a business; (xi) a stake in a business; (xii) an investment; (xiii) an annuity; (xiv) a property of any kind; (xv) a debt or obligation owed to the person; and/or (xvi) a death benefit. In some instances, an estate asset may, wholly or partially, be owned by, or belong to, another person, such that the asset doesn't become fully disposable under the estate unless, or until, the other person is also deceased. For example, a bank account may be jointly held by a husband and wife, and only be disposable when the last of them dies.

As used herein, the term "asset data" will refer to any number and/or type(s) of data or information that, wholly or partially, collectively represent an estate asset. In general, asset data may represent the metes and bounds of an estate asset. Asset data may be used to determine what is owned, under what conditions or obligations the asset is owned, a value of the asset, what the asset represents, obligations associated with the asset, conditions attached to the asset, how and/or when the asset is to be disposed, etc. Exemplary asset data for an estate asset may include, but is not limited to, images or videos, descriptions, financial statements, agreements, contracts, account information, documents, or beneficiary information.

As is commonly known and as used herein, XR refers to the use of any virtual environment, or mixed real-and-virtual environment, wherein at least a portion of human-to-machine or human-to-human interactions are generated using XR technology and/or XR devices. An XR environment may include one or more of augmented reality (AR), mixed reality (MR), virtual reality (VR), or combinations thereof. An XR environment may include one or more visual environments or components, possibly with an audio component (e.g., spoken words of another person or a voice bot) or a text component as well. VR may refer to an immersive user experience, where the user can experience the sensation of a three-dimensional (3D) environment without real-world elements/images. AR may refer to an annotation, overlay, or augmentation of text or media content, such as graphics content, onto real-world content, such as images or videos of a real-world scene, or onto a direct visual impression of the real world, such as may be seen through the transparent glass or plastic portion of smart glasses. MR may refer to an annotation, overlay, augmentation, or mixing of synthetic content, such as computer generated graphics, virtual scenery, virtual images, or other mixed reality content with real-world content. In various embodiments, XR environments disclosed herein may be parts of a network of three-dimensional (3D) virtual worlds, such as a metaverse.

An XR device may generally be any computing device capable of visualizing and presenting virtual content in conjunction with, or separate from, real-world content to generate a partial or wholly virtual environment or experience for a user. Exemplary XR devices include a wearable AR headset or smart glasses, a wearable MR headset or smart glasses, a wearable VR headset or smart glasses, smart glasses, smart contacts, smart displays or screens, a mobile device, a tablet, a device having a speaker and microphone, or a device having a text-based interface. An XR device may include one or more input controls, such as one or more physical buttons located on the XR device itself, or one or more physical buttons located on handheld controllers or devices worn on a hand, foot, or other body part (i.e., "worn devices") used in conjunction with the XR device.

Handheld controllers or worn devices may include one or more inertia, orientation or position sensors to sense movements, gestures, positions, orientations, etc. of a wearer or user, or a body part of the wearer or user. For example, handheld controllers or worn devices may be used to virtually (e.g., using gestures) point at, select, activate, or otherwise interact with one or more elements of a UI provided or presented within a virtual environment via an XR device. Input may also be provided using physical touchscreen inputs on screens of the XR device (e.g., a screen of a smart phone or personal computer), or using a computing device (e.g., a smart phone or personal computer) associated with the XR device.

An XR device may also include audio or text input devices configured to enable a real, or XR environment to include text-based interactions (e.g., virtual user interfaces within the virtual environment for selecting or otherwise entering text, and/or for presenting text), or audio (e.g., one or more speakers and one or more microphones of the XR device, to support spoken interactions). The audio and text input devices may also be configured to enable a wearer or user to interact with, respectively, a voice bot or a chatbot, for example. The audio and text input devices may also be used to generally control the XR device itself.

In some embodiments, an XR device and its input controls may be used to physically or virtual write text (e.g., using virtual gestures), type text (e.g., using a virtual or physical keyboard), and speak text.

In some embodiments, described XR devices may be any commercial XR device, such as a Google Glass® device, a Google Cardboard® device, a Google Daydream® device, a Microsoft Hololens® device, a Magic Leap® device, an Oculus® device, an Oculus Rift® device, a Gear VR® device, a PlayStation® VR device, or an HTC Vive® device, to name a few. In general, each of these example XR devices may use one or more processors or graphic processing units (GPUs) capable of visualizing multimedia content in a partial or wholly virtual environment.

For example, a Google Cardboard VR device includes a VR headset that uses one or more processors or GPUs of an embedded smart phone, such as a smart phone, which, in some embodiments, may be a Google Android-based or Apple iOS-based smart phone, or other similar computing device, to visualize multimedia content in a virtual environment. Other XR devices, such as the Oculus Rift VR device, may include a VR headset that uses one or more processors or GPUs of an associated computing device, such a personal computer/laptop, for visualizing multimedia images in an XR environment. The personal computer/laptop may include one or more processors, one or more GPUs, one or more computer memories, and software or computer instructions for performing the visualizations, annotations, or presentation of multimedia content or VR environments as described herein. Still further, XR devices may include one or more processors or GPUs as part of an XR device may operate independently from the processor(s) of a different computing device for the purpose of visualizing multimedia content in a virtual environment.

While embodiments are described herein with reference to exemplary XR technologies and exemplary XR devices, persons of ordinary skill in the art will recognize that disclosed embodiments may be implemented using any combination of past, current, or future XR technologies and/or XR devices. Moreover, for readability, "using XR," "with XR," or similar phrases may be used herein as shorthand for more unwieldy phrases, such as "using one or more XR devices, XR technologies, or XR environments," or similar phrases.

Unless expressly stated to the contrary, "or" refers to an inclusive or and not to an exclusive or. For example, "A, B, or C" refers to any combination or subset of A, B, C such as (1) A alone, (2) B alone, (3) C alone, (4) A with B, (5) A with C, (6) B with C, and (7) A with B and with C.

Reference will now be made in detail to non-limiting embodiments, some of which are illustrated in the accompanying drawings.

Exemplary Extended Reality (XR) System

FIG. 1 is a schematic diagram of an exemplary XR system 100, in accordance with various embodiments of the present disclosure. In various embodiments, the exemplary XR system 100 may provide, using one or more XR devices 102 and/or one or more XR technologies, one or more XR environment(s) 104 (i.e., virtualized environments) to a person 106. The XR environment(s) 104 may enable the person 106 to collect, provide, manage, use, or otherwise handle estate data 108 for their estate while they are alive In various embodiments, one or more servers 110 may obtain estate data 108 by generating, and providing or presenting the XR environment(s) 104 that the person 106 may use to virtually collect, provide, manage, use, or otherwise handle their estate data 108. The XR environment(s) 104 may be provided or presented by, or using, the XR device(s) 102 associated with, used by, worn by, etc. the person 106. Exemplary XR devices 102 include, but are not limited to, a mobile or smart phone 112, a tablet, AR smart glasses 114, a VR headset 116, and a personal computer/laptop 118, to name some. In some embodiments, the person 106 may, alternatively and/or additionally, use non-XR devices (not shown for clarity of illustration) to collect, provide, manage, use, or otherwise handle their estate data 108 without using XR.

The XR environment(s) 104 may be provided or presented using the VR headset 116 such that the person 106 has a substantially immersive user experience in the XR environment(s) 104, where the person 106 can experience the sensation(s) of a 3D virtual environment without real-world elements/images. Additionally and/or alternatively, the XR environment(s) 104 may be provided or presented using the AR smart glasses 114 such that the XR environment(s) 104 includes text, media content, or graphics content overlaid onto real-world content, such as images or videos of a real-world scene, or onto a direct visual impression of the real world, such as may be seen through the transparent glass or plastic portion of the smart glasses 114 while experiencing the XR environment(s) 104.

Extended Reality (XR) Devices

In some embodiments, the person 106 may use XR via their XR device(s) 102 to virtually interact, wholly or partially, with the server(s) 110 to collect, provide, manage, use, or otherwise handle estate data 108, as described. For example, the person 106 may use one or more input controls of the XR device(s) 102 to input data, or select options from menus, lists, selectable graphics, or other items as displayed on a user interface screen of the XR device(s) 102 to virtually collect, provide, manage, use, or otherwise handle estate data 108. The person 106 may also use the input controls to provide commands to the XR device(s) 102 to control the XR device(s) 102. In some embodiments, the person 106 may use the input controls of an XR device to write, type, or speak text or other content, or commands.

The XR device(s) 102 may also include one or more output devices, such as one or more displays or speakers that allow the XR device(s) 102 to display or present virtual computer-generated content associated with an XR environment. Exemplary generated content includes visual content, audible content, or combinations thereof. Exemplary generated content represents one or more visual depictions of the estate data 108. In some embodiments, at least one of the one or more XR environment(s) 104 includes the generated content. In some examples, the XR device(s) 102 only present virtual content, such that the person 106 may be fully immersed in an XR environment. Additionally and/or alternatively, the XR device(s) 102 may present or display the virtual content on top of, alongside, or otherwise in combination with real-world content such that the person 106 may be only partially immersed in an XR environment. In some embodiments, an exemplary XR environment causes the one or more output devices to provide or present instructions, questions, prompts, etc. to direct the person 106 to make a selection, provide an input, etc.

Obtaining Estate Data

In some embodiments, the server(s) 110 may obtain the estate data 108 by presenting or providing one or more user interfaces (UIs) 120 in the one or more XR environment(s) 104 provided or presented on, or using, the person's XR device(s) 102. The UIs 120 may include one or more input elements, usable by the person 106, to collect, provide, manage, use, or otherwise handle their estate data 108.

In some embodiments, the person 106 may, while alive, virtually operate the one or more input elements to select, enter, or otherwise provide estate data 108. For example, the person 106 may operate the one or more input elements to select, enter, or otherwise provide (i) asset data related to assets of their estate; (ii) insurance policy details; (iii) beneficiary data related to who owns their assets upon their death; (iv) executor data related to who controls their assets upon their death; and/or (v) documents, such as will, trusts, contracts, agreements, deeds, etc., that represent how one or more assets of their estate are to be disposed of, legally or financially, upon the death of the person 106. However, the estate data 108 may include any number and/or type(s) of other applicable data, information, documents, etc.

In some embodiments, the person 106 may virtually operate the one or more input elements using one or more of virtual gestures, spoken words, virtual or physical keyboards, virtual handwriting, etc. For example, virtual gestures may be used to activate input elements or portions of the UIs 120, make selections, check and un-check check boxes, move between portions of the UIs 120, write words, type words, select and upload documents, capture and upload images of documents or assets, etc. Spoken, written, and/or typed text or content may be used to enter information into text boxes, for example. Additionally and/or alternatively, spoken, written, and/or typed text or commands may, like virtual gestures, be used to activate input elements or portions of the UIs 120, make selections, check and un-check check boxes, move between portions of the UIs 120, write words, type words, select and upload documents, capture and upload images of documents or assets, etc.

In some embodiments, the server(s) 110 may use optical character recognition (OCR), speech/text recognition, and/or natural language processing (NLP) to convert spoken, written, or typed text into digitized asset data or estate data 108. Additionally and/or alternatively, the server(s) 110 may use OCR, speech/text recognition, and/or NLP to convert content of uploaded documents or images into asset data or digital estate data 108. For example, the server(s) 110 may process (i) insurance documents (e.g., containing insurance policy terms, declarations, riders, conditions, etc.) to extract insurance policy information, beneficiary information, and/or asset data, (ii) bank or investment statements to extract account information, etc. In such examples, the server(s) 110 may guide or prompt the person 106 for further details that the server(s) 110 were not able to automatically determine from spoken, written, or typed text, and/or the documents or images.

In some embodiments, the server(s) 110 may guide the person 106 (e.g., by asking a sequence of questions, or presenting or providing a sequence of prompts) to assist in the identification of potential assets, the providing of asset data, and/or the providing of documents, or the providing of other data or information related to their estate. Additionally and/or alternatively, the person 106 may autonomously operate input elements of provided or presented UIs 120.

In some embodiments, an XR environment, such as the XR environment(s) 104 and/or the UIs 120, may be presented or provided, and used by another person who is authorized by the person 106 to select, enter, or otherwise provide estate data 108 on behalf of the person 106. Such a person may be a representative 122, such as a trustee, lawyer, accountant, financial planner, spouse, family member, insurance agent, estate planner, etc. The representative 122 may also be a person who may guide or assist the person 106 in the selection, entering, or otherwise providing of estate data 108.

In some embodiments, the representative 122 may use XR via their XR device(s) 124 to virtually interact, wholly or partially, with the server(s) 110 to collect, provide, manage, use, or otherwise handle estate data 108, as described above in connection with the person 106. For example, the representative 122 may use one or more input controls of the XR device(s) 124 to input data, type, write or speak text or content, or select options from menus, lists, selectable graphics, or other items as displayed on a user interface screen of the XR device(s) 124 to (i) collect, provide, manage, use, or otherwise handle estate data 108; (ii) review disposition options for assets, and select disposition options; and/or (iii) guide or assist the person 106. As described below, the representative 122 may, as described below and after the person 106 dies, also use the input controls to assist a person 132 with (i) viewing estate data 108; (ii) reviewing disposal options for assets; (iii) selecting disposal options; and/or (iv) disposing of assets. The input controls may also allow the representative 122 to provide commands to the XR device(s) 124 to generally control the XR device(s) 124.

The XR device(s) 124 may also include one or more output devices, such as one or more displays or speakers that allow the XR device(s) 124 to display or present virtual computer-generated content associated with an XR environment. Exemplary generated content includes visual content, audible content, or combinations thereof. Exemplary generated content represents one or more visual depictions of the estate data 108 and/or disposal options. In some embodiments, at least one of the one or more XR environment(s) 104 includes the generated content. In some examples, the XR device(s) 124 may only display or present virtual content, such that the representative 122 may be fully immersed in an XR environment. Additionally and/or alternatively, the XR device(s) 124 may display or present virtual content on top of, alongside, or otherwise in combination with real-world content, such that the representative 122 may be only partially immersed in an XR environment. In some embodiments, an exemplary XR environment causes the one or more output devices to provide or present instructions, questions, prompts, etc. to direct the representative 122 to make a selection, provide an input, etc.

In various embodiments, at least one of the XR environment(s) 104 includes a virtual meeting of the person 106 and another person, such as the representative 122. In some embodiments, the virtual meeting may occur in a virtual office or meeting space that mimics a live person-to-person meeting that may occur in a physical office or meeting space. For instance, the virtual meeting may take place in a metaverse room, location, scene, etc., for example, in accordance with one or more XR or metaverse preferences of the person 106.

In some embodiments, the virtual meeting may include a collaborative XR environment that the person 106 and the other person may use to virtually and collaboratively select, enter, or otherwise provide the estate data 108. The virtual meeting may include respective XR environments for the person 106 and the other person such that they are together virtually as they meet via respective XR device(s). In some embodiments, the person 106 and the other person are represented in the virtual meeting by respective avatars, or other representations. However, in some examples, the avatar may not be associated with an actual person, such that the person 106 may instead interact with an avatar representing a computer-generated persona of a computer-generated, virtual representative (e.g., an avatar for a voice bot or chatbot).

In some embodiments, the server(s) 110 may authenticate the person 106 before the person 106 may access the estate data 108 and/or, more generally, an account belonging to the person 106 provided by the server(s) 110. For example, the person 106 may be required to provide a user name and password, a finger print, or other authenticating information. In some embodiments, two-step authentication may also be used.

The server(s) 110 may obtain preference data 126 (e.g., personal data and/or XR preferences for the person 106), and customize, personalize, or configure the XR environment(s) 104 and/or a virtual meeting based upon, or according to, the preference data 126. Exemplary personal data includes one or more of notification preferences (e.g., phone vs. text vs. email), username, password, telephone number(s), social media data, financial account data, insurance policy(-ies), insured homes, properties, items, objects, assets, etc. Exemplary XR preferences includes one or more of any preferences related to XR or metaverse experiences and interactions including, for example, virtual interaction preferences (e.g., prefer to use VR over AR, only use AR, preferred avatar, a metaverse preference, a preferred metaverse scene, a preferred avatar, a metaverse identifier, a preferred XR device, a preferred XR device type, an XR identifier, preferred metaverse or other setting for a virtual meeting, etc.), type(s) of or identifier(s) for the person's XR device(s), willingness to hold virtual meetings (rather than real-world meetings) with a representative 122, where or how the person 106 prefers to meet (e.g., virtual home or virtual office in a metaverse, with the representative's avatar in person's actual home or place of business using AR, or in another setting such as outdoors, at the beach, in the woods, during a stroll, etc.), preferred time(s) or days-of-week to meet, etc.

In some embodiments, the server(s) 110 may notify or invite the person 106 to XR environment(s) 104 and/or virtual meetings according to the person's notification preferences. For example, the server(s) 110 may send to the person 106 a text notification with a link to initiate an XR environment 104 or a virtual meeting. In some embodiments, the notification or invitation for a virtual meeting may correspond to a scheduled time for the virtual meeting, such as when two actual persons will participate in the virtual meeting. However, some notifications or invitations may be activated at any day or time, such as when the person 106 will be the only actual person in a virtual meeting. In some embodiments, the server(s) 110 may collect the insured person's personal data 126 when the person 106 interacts with the server(s) 110 to provide the estate data 108 using XR. Additionally and/or alternatively, the personal data 126 may be provided to the server(s) 110 when the person 106 responds to a notification for, or an invitation to, an XR environment 104 and/or a virtual meeting.

In some embodiments, the server(s) 110 may access any number and/or type(s) of databases or data sources 128 to obtain estate data 108. For example, the person 106 may provide credentials and authorization such that the server(s) 110 may access a bank's servers to obtain account information and/or information regarding the person's accounts at the bank. For example, the person 106 may provide credentials and authorization such that the server(s) 110 may access a government database to obtain information regarding the person's social security or other government benefits. For example, the server(s) 110 may access databases holding product information, stock information, etc. to determine past or current values of financial assets or belongings. In such examples, the server(s) 110 may guide or prompt the person 106 for further details related to assets when the server(s) 110 was not able to automatically determine, either from uploaded documents and/or from data obtained from the data sources 128.

The server(s) 110 may, as described above in connection with the person 106, obtain preference data (e.g., personal data and/or XR preferences) for the representative 122, and customize, personalize, and configure XR environments and/or virtual meetings for the representative 122 based upon, or according to, their personal data. The server(s) 110 may, as also described above, provide notifications and/or invitations for XR environment(s) and/or virtual meetings to the representative 122.

In certain embodiments, the server(s) 110 may cause estate data 108 to be stored on a distributed ledger, such as a blockchain, for remote viewing and/or to facilitate subrogation, claim processing, dispute resolution, etc. In some embodiments; the server(s) 110 may cause the estate data 108 to be stored on the distributed ledger by sending the estate data 108 to one or more nodes of a plurality of nodes maintaining the distributed ledger. In response and on behalf of the server(s) 110, the one or more nodes may attempt to form a cryptographic consensus as to how the estate data 108 is to be integrated into the distributed ledger, and, if consensus is obtained, provide the estate data 108 to the plurality of nodes such that each node may add the estate data 108 to respective copies of the distributed ledger. Additionally and/or alternatively, the server(s) 110 may be one of the nodes maintaining a distributed ledger, and may work directly with the other nodes to form a cryptographic consensus for the estate data 108 and, when consensus is obtained, cause the other nodes to store the estate data 108 on respective copies of the distributed ledger.

Disposal of Assets

In various embodiments, the server(s) 110 may dispose of assets by generating, and providing or presenting one or more XR environment(s) 130 (i.e., virtualized environments) that a person 132 may use to virtually view the estate data 108, review disposal options for assets, select disposal options, and/or dispose of assets. The XR environment(s)

130 may be provided or presented by, or using, one or more XR devices 134 associated with, used by, worn by, etc. the person 132. Example XR devices 134 include, but are not limited to, a mobile or smart phone 136, a tablet, AR smart glasses 138, a VR headset 140, smart contacts, and a personal computer/laptop 142, to name some. In some embodiments, the person 132 may also use non-XR devices (not shown for clarity of illustration) to, without using XR, view one or more portions of the estate data 108, review disposal options for assets, select disposal options, and dispose of assets.

In certain examples, the person 132 may also be, legally and/or financially, and/or wholly or partially, responsible for disposing of one or more assets. For instance, the person 132 may be a beneficiary, an executor of the state, a trustee, a lawyer, an accountant, a financial planner, a spouse, an insurance agent, an estate planner, etc.

In some embodiments, the person 132 may use XR via their XR device(s) 134 to virtually interact, wholly or partially, with the server(s) 110 to handle disposition of estate assets. For example, the person 106 may use one or more input controls of the XR device(s) 134 to input data, write, type or speak text or content, or select options from menus, lists, selectable graphics, or other items as displayed on a user interface screen of the XR device(s) 134 to dispose of estate assets. The input controls may also allow the person 132 to provide commands to the XR device(s) 134 to generally control the XR device(s) 134.

The XR device(s) 134 may also include one or more output devices, such as one or more displays or speakers that allow the XR device(s) 134 to display or present virtual computer-generated content associated with an XR environment. Exemplary generated content may include visual content, audible content, or combinations thereof. Exemplary generated content may represent one or more visual depictions of asset data, the estate data 108, and asset disposition options. In some embodiments, one or more XR environment(s) 130 provided or presented on the XR device(s) 134 includes the generated content. In some examples, only virtual content is provided or presented by an XR device(s) 134 such that the person 132 is fully immersed in an XR environment.

Additionally and/or alternatively, the virtual content may be displayed on top of, alongside, or otherwise in combination with real-world content such that the person 132 is only partially immersed in an XR environment. In some embodiments, an exemplary XR environment causes the one or more output devices to provide or present instructions, questions, prompts, etc. to direct the person 132 to make a selection, provide an input, etc.

In some embodiments, the server(s) 110 may authenticate the person 132 before granting the person 132 access to estate data 108 for the person 106, and/or, more generally, to access an account belonging to the person 106 and/or an account belonging to the person 132 hosted by the server(s) 110. For example, the person 132 may be required to provide a user name and password, or a finger print. In some embodiments, two-step authentication may also be used. In some embodiments, the server(s) 110 may permit the person 132 to view a portion of the estate data 108 that the person 132 is authorized to view, and/or to only dispose of assets that the person 132 is authorized to dispose.

In some embodiments, the server(s) 110 obtains, from the person 132, a death certificate for the person 106 before the server(s) 110 allows the person 132 to access the estate data 108, or dispose of estate assets. In some examples, the person 132 may provide the death certificate to the server(s) 110 by submitting an electronic copy of the death certificate, submitting an image of the death certificate, etc. In some embodiments, the server(s) 110 may authenticate the death certificate using watermarking or other unique indelible characteristics. Additionally and/or alternatively, the server(s) 110 may automatically receive death notifications from appropriate government agencies, and/or poll government agencies for death notifications.

For example, the server(s) 110 may dispose of assets by presenting or providing one or more UIs 144 in the one or more XR environment(s) 130 provided or presented on, or using, the person's XR device(s) 134. The UIs 144 may include one or more input elements, usable by the person 132, to use XR to view estate data 108, review disposal options for assets, select disposal options, and dispose of assets. As described above, the person 132 may virtually operate (e.g., using virtual gestures, spoken words, virtual or physical keyboards, virtual handwriting, etc.) the one or more input elements of the UIs 144 to use XR to view one or more portions of the estate data 108, review disposal options for assets, select disposal options, and dispose of assets.

In some embodiments, the server(s) 110 may guide the person 132 (e.g., by asking a sequence of questions, or presenting or providing a sequence of prompts) to assist in the identification of potential assets, the review of asset disposal options, or the selection of disposal options. Additionally and/or alternatively, the person 132 may autonomously operate input elements of provided or presented UIs 144.

In some embodiments, the XR environment(s) 130 and/or the UIs 144 may also be used by another person, such as the representative 122, who is authorized by the person 106 and/or the person 132 to view estate data 108, review disposal options for assets, select disposal options, and dispose of assets on behalf of the person 132. The representative 122 may also be a person who guides or assists the person 132 in (i) reviewing one or more portions of the estate data 108; (ii) reviewing asset disposal options; (iii) selecting disposal options; and/or (iv) executing selected disposal options.

In some embodiments, when asset disposals are selected and/or executed, the server(s) 110 may add corresponding disposal records to the estate data 108, and corresponding asset records may also be updated in the estate data 108 to reflect that the asset (s) have been disposed of. In certain embodiments, the server(s) 110 may cause the updated estate data 108 (e.g., with the disposal records and updated asset records) to be stored on a distributed ledger, such as a blockchain, for remote viewing and/or to facilitate subrogation, claim processing, dispute resolution, etc. In some embodiments, the server(s) 110 may cause the updated estate data 108 to be stored on the distributed ledger by sending the updated estate data 108 to one or more nodes of a plurality of nodes maintaining the distributed ledger.

In response and on behalf of the server(s) 110, the one or more nodes may attempt to form a cryptographic consensus as to how the updated estate data 108 is to be integrated into the distributed ledger, and, if consensus is obtained, provide the updated estate data 108 to the plurality of nodes such that each node may add the updated estate data 108 to respective copies of the distributed ledger. Additionally and/or alternatively, the server(s) 110 may be one of the nodes maintaining the distributed ledger, and may work directly with the other nodes to form a cryptographic consensus for the updated estate data 108 and, when consensus is obtained, cause the other nodes to store the updated estate data 108 on respective copies of the distributed ledger. Certain embodiments may also use computer vision and/or connected infrastructure data to resolve disputes associated with damage-causing events.

In various embodiments, at least one of the XR environment(s) 130 may include a virtual meeting of the person 132 and another person, such as the representative 122. In some embodiments, the virtual meeting may occur in a virtual office or meeting space that mimics a real person-to-person meeting that may occur in a physical office or meeting space. For instance, the virtual meeting may take place in a metaverse room, location, scene, etc., for example, in accordance with one or more XR or metaverse preferences of the person 132.

In some embodiments, the virtual meeting may include a collaborative XR environment in which the other person and the person 132 may virtually and collaboratively view one or more portions of the estate data 108, review disposal options for assets, select disposal options, and dispose of assets. In certain embodiments, the virtual meeting may include respective XR environments for the person 132 and the other person such that they are together virtually as they meet via respective XR device(s). In some embodiments, the person 132 and the other person are represented in the virtual meeting by respective avatars, or other representations. However, in some examples, the avatar may not be associated with an actual person, such that the person 106 may instead interact with an avatar for a computer-generated persona of a computer-generated, virtual representative, or a voice bot or chatbot.

In some embodiments, the representative 122, or a virtual agent, may, during the virtual meeting, lead the person 132 (e.g., in their capacity as a beneficiary or executor) through wills, trusts, insurance bequeaths, or any other part of the estate data 108 in a metaverse room or virtual location of the person's choosing (e.g., based upon their preference data 146), and may assist the person 132 in the selection of payment options or accounts virtually, visually, or audibly.

The server(s) 110 may, as described above in connection with the person 106, obtain preference data 146 (e.g., personal data and/or XR preferences) for the representative 122, and customize, personalize, and configure the XR environment(s) 130 and/or virtual meetings for the person 132 based upon the preference data 146. The server(s) 110 may, as also described above, provide notifications and/or invitations for the XR environment(s) 130 and/or virtual meetings.

Exemplary Server(S)

In some embodiments, the server(s) 110 may be associated with a company, business, etc. that provides one or more estate services, and the estate data 108 may be stored in a database hosted by the server(s) 110. Additionally and/or alternatively, the server(s) 110 may provide XR services and/or XR environments on behalf of other companies, business, etc., and may not store the estate data 108. Instead, in some embodiments, a company that provides estates services may host the estate data 108 and, as necessary, may provide the server(s) 110 secure access to the estate data 108. In some embodiments, the estate data 108 make be made accessible to other companies, business, etc. such that the persons 106, 122, and 132 may employ estate-related services from the multiple companies, business, etc. based upon a shared database of estate data 108.

The estate data 108 may be stored using any number and/or type(s) of records, entries, data structures, etc. on any number and/or type(s) of non-transitory computer- or machine-readable storage medium such as a compact disc (CD), a hard drive, a digital versatile disk (DVD), a Blu-ray disk, a cache, a flash memory, a read-only memory (ROM), a random access memory (RAM), or any other storage device or storage disk associated with a processor in which information may be stored for any duration (e.g., for extended time periods, permanently, for brief instances, for temporarily buffering, and/or for caching).

The servers(s) 110 may include any number(s) and/or type(s) of physical server computers or virtual, cloud-based servers, which may operate as a server farm, and may include one or more processors, one or more computer memories, and software or computer instructions for handling estate data. The server(s) 110 may be local to, or remote from, the XR device(s) 102, 124, and 134.

In some embodiments, the XR device(s) 102, 124, and 134 may be communicatively coupled to the server(s) 110 via any number and/or type(s) of public and/or private computer networks 148, such as the Internet. In some embodiments, the XR device(s) 102, 124, and 134 access the network(s) 148 via any number and/or type(s) of wired or wireless networks (not shown for clarity of illustration). For example, the XR device(s) 102, 124, and 134 may be communicatively coupled to the network(s) 148 via any number and/or type(s) of wireless or cellular base stations 150. The base station(s) 150 may be implemented in accordance with any number and/or type(s) of communications standards including Global System for Mobile Communications (GSM), Code Division Multiple Access (CDMA), Universal Mobile Telecommunications System (UMTS), Long Term Evolution (LTE), 3G, 4G, 5G, or the Institution of Electrical and Electronics Engineers (IEEE) 802.11x family of standards. Additionally and/or alternatively, the XR device(s) 102, 124, and 134 may be communicatively coupled to the network(s) 148 via any number and/or type(s) of wired interfaces, such as an Ethernet interface, or a wired broadband Internet access interface. However, the XR device(s) 102, 124, and 134 may be coupled to the server(s) 110 in any other ways, including any type(s) of input/output interfaces, such as a universal serial bus (USB) interface, a near-field communication (NFC) interface, or a Bluetooth® interface.

Exemplary User Interfaces

FIGS. 2-7 illustrate exemplary UIs that may be used by the server(s) 110 to obtain or receive data or information, and/or by users to provide data or information, depending on context. For example, the server(s) 110 may obtain or receive data or information from a person (e.g., one of the persons 106, 122, 132) by providing or presenting an XR environment (e.g., one of the exemplary XR environments 104, 130) using an XR device 201 (e.g., one of the exemplary XR devices 102, 124, 134) associated with the person, and/or a UI (e.g., one of the exemplary UIs of FIGS. 2-7) in an XR environment, that the person may, correspondingly, use to provide the data or information. A VR headset worn by a person by present or provide the exemplary UIs in an XR environment using the VR headset worn, such that the person may interact virtually with the server(s) 110 in an immersive experience to provide preference data or information. Additionally and/or alternatively, a UI may be presented or provided in addition to, or overlaid on, real-world content viewable through or via an AR device in an augmented reality fashion, and/or or on an image of real-world content being displayed by the XR device for the person.

While exemplary visual UIs are shown in FIGS. 2-7, and described below, it should be understood that audio-based UIs (e.g., using a voice bot) or text-based UIs (e.g., using a chatbot) may, additionally and/or alternatively, be used by the server(s) 110 to obtain or receive data or information, and/or by users to provide data or information.

Figure 2:
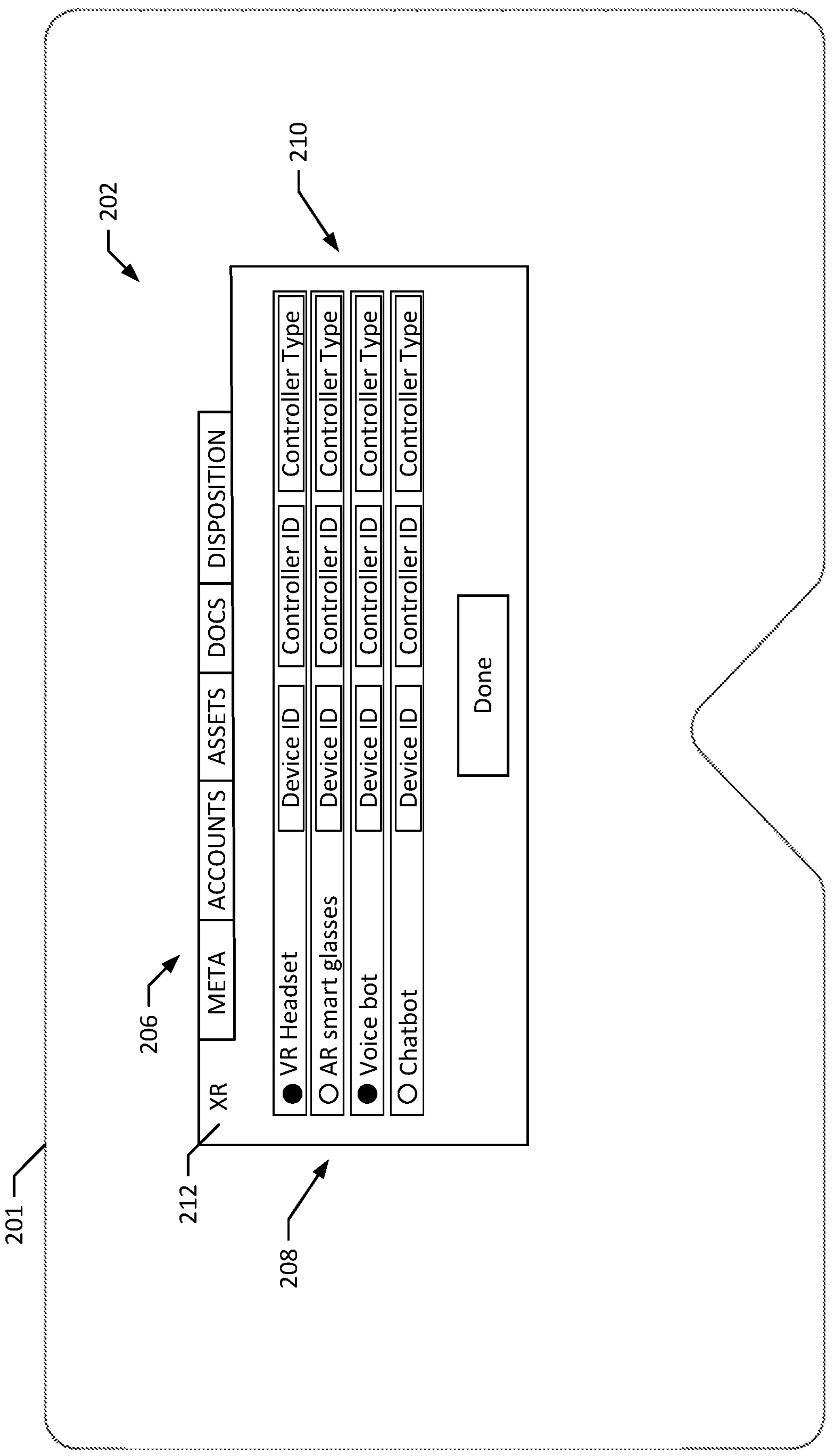
FIG. 2 illustrates an exemplary preferences input user interface for obtaining and/or providing preferences using XR.

FIG. 2 illustrates an exemplary preferences input UI 202 for obtaining or receiving, and/or providing, preference data (e.g., personal data and/or XR preferences, etc.) using XR. The UI 202 may include any number and/or type(s) of interface elements including tabs 206, check boxes 208, and/or text entry boxes 210, for example.

The exemplary UI 202 specifically relates to providing and obtaining information related to XR preferences, and may be presented or provided when a person (e.g., one of the persons 106, 122, 132) virtual taps or selects (e.g., using gestures) an element of another UI (not shown for clarity of illustration) to initiate configuration of XR devices, for example. In the depicted example, a selected tab 212 enables the person to provide information related to an XR device (e.g., one of the XR device(s) 102, 124, 134). In some embodiments, the tab 212 may be virtually selected (e.g., using gestures) or may be selected by speaking "configure XR devices," for example. The person may select other tabs 212 to similarly provide other types of preference data.

As depicted, the check boxes 208 enable the person to indicate which XR device(s) 102, 124, 134 they have. In the example shown, the person has a VR headset, and a voice bot.

The person may enter text into the text boxes 210 by speaking, typing or writing words corresponding to the desired content, for example. In the depicted example, text boxes relate to device identifiers, handheld controller identifiers, and handheld controller types. To configure an XR device, the person may check a check box 208 corresponding to a particular XR device, and enter a device identifier, a handheld controller identifier, and a handheld controller type into the corresponding text boxes 210 by speaking, typing, or writing text, for example.

Figure 3:
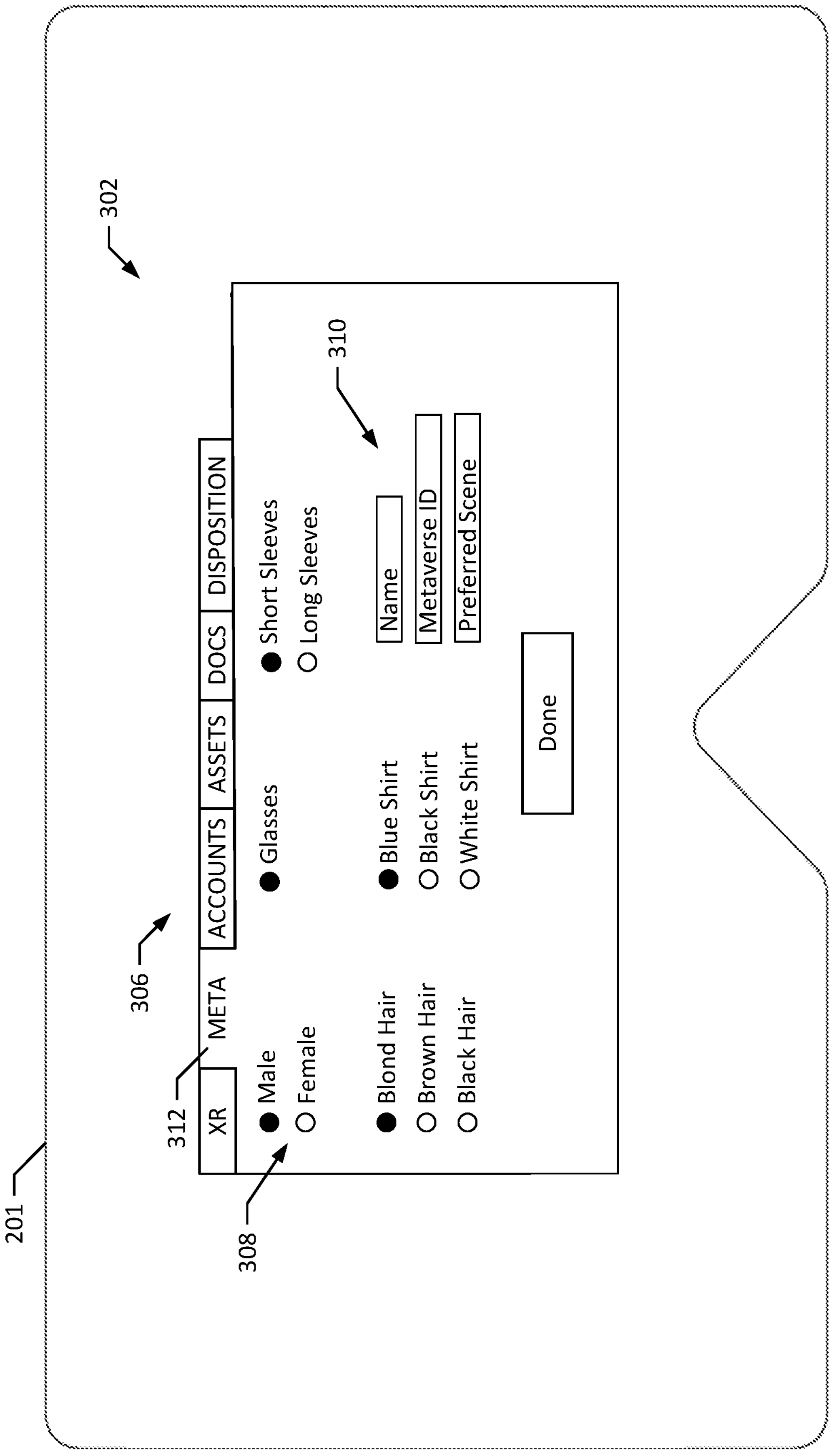
FIG. 3 illustrates an exemplary preferences input user interface for obtaining and/or providing preferences using XR.

FIG. 3 illustrates another exemplary preferences input UI 302 for providing, and/or obtaining or receiving, preference data (e.g., personal data and/or XR preferences, etc.) using XR. The UI 302 may include any number and/or type(s) of interface elements including tabs 306, check boxes 308, and/or text entry boxes 310, for example. The person may select other tabs 306 to similarly provide other types of preference data.

The exemplary UI 302 relates to providing information related to a preferred avatar, and may be provided or presented when a user virtual taps or selects (e.g., using gestures or spoken commands), an element of another UI (not shown for clarity of illustration) to initiate configuration, for example. In the depicted example, a selected tab 312 enables the person to provide information related to a metaverse avatar. In some embodiments, the tab 312 may be virtually selected (e.g., using gestures or spoken commands) or may be selected by speaking "configure metaverse," for example.

As depicted, the check boxes 308 enable the person to select various characteristics (e.g., sex, hair color, glasses, shirt color, and shirt sleeve length) of their metaverse avatar. In the example shown, the avatar is to be male, have blond hair, wear glasses, and wear a blue short sleeved shirt.

The person may enter text into the text boxes 310 by speaking, typing or writing words corresponding to the desired content, for example. In the depicted example, text boxes relate to the avatar's name, a unique metaverse identifier for the person, and a preferred metaverse scene. A preferred metaverse scene may represent a particular virtual scene in which the person wants to, such as a bench overlooking an ocean, at a coffee shop, etc.

While exemplary preference input UIs 202 and 302 are shown in FIGS. 2 and 3, it should be understood that UIs useful for providing and/or obtaining or receiver preference data may be constructed using any number and/or type(s) of additional and/or alternative user and/or input elements, arranged in any number and/or type(s) of other ways and be useful for providing any number and/or type(s) of preference data.

Figure 4:
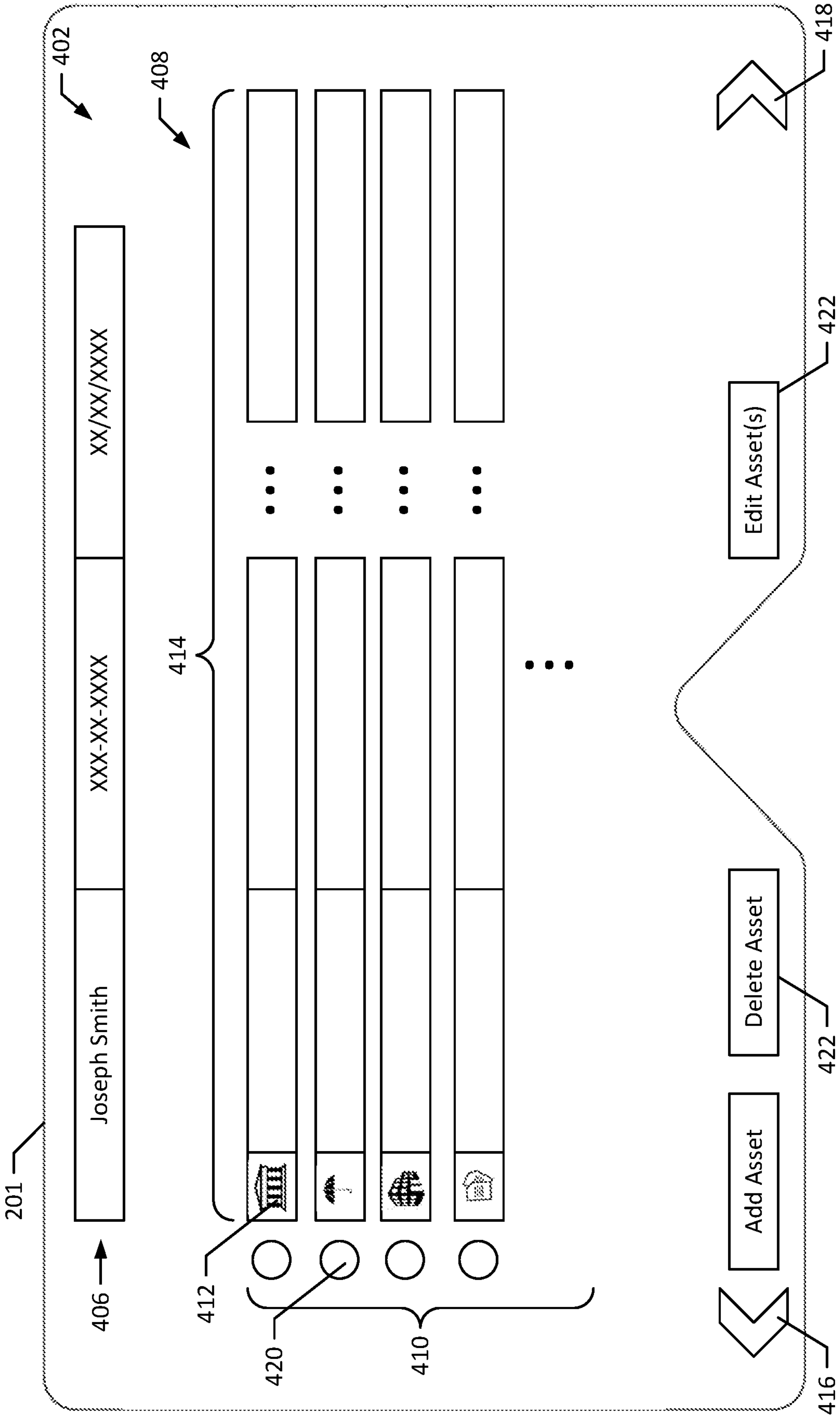
FIG. 4 illustrates an exemplary estate data user interface for obtaining and/or providing estate data using XR.

FIG. 4 illustrates an exemplary estate data UI 402 for obtaining or receiving, and/or providing, estate data (e.g., such as the estate data 108) using XR. The headset 201 worn by a person may present or provide the UI 402 in an XR environment provided or presented using the XR headset 201 worn by a person (e.g., the person 106). The person may, via the estate data UI 402 to interact virtually with the server(s) 110 using XR to provide estate data. Additionally and/or alternatively, the UI 402 may be presented or provided in addition to, or overlaid on, real-world content viewable through a lens of the smart glasses in an augmented reality fashion, and/or or on an image being displayed on the lens. Other embodiments may involve the use of smart contact lenses or retinal implants, such as to display the estate data in an XR or AR format or manner.

The exemplary UI 402 includes a plurality of display boxes 406 displaying personal data for the person 106, such as their name, social security number, and date of birth. However, alternative and/or additional data may be shown. In some embodiments, the person 106 cannot change the data displayed in the boxes 406.

The exemplary UI 402 also displays a table of estate data 408 that includes a plurality of rows 410 corresponding to respective asset records for respective estate assets. Each row 410 includes a graphic 412 representing asset type, and a plurality of fields 414 displaying different pieces of data of the asset record for the estate asset associated with the row. Example data may include (i) who holds the asset (e.g., bank, insurance company, etc.); (ii) an identifier associated with the asset, if applicable (e.g., account number, policy number, etc.); (iii) a description of asset; (iv) associated beneficiaries; etc.

As shown, the UI 402 may consist of multiple pages of estate data 408, and the person may use navigation UI elements 416 and 418 to move between pages.

In some embodiments, the person may review or modify the asset record for an asset by, for example, virtually clicking (e.g., using gestures or spoken commands) on a corresponding graphic 412. Clicking on the graphic 412 for an asset may, for example, cause the exemplary asset data UI 502 of FIG. 5 to be presented or provided. Additionally and/or alternatively, the person may select asset records for review or modification by checking respective ones of checkboxes 420, and virtually activating (e.g., using gestures or spoken commands) a UI element 422.

In some embodiments, the UI 402 may include a UI element 424 that may be virtually activated (e.g., using gestures or spoken commands) to delete selected assets, and a UI element 426 that may be virtually activated (e.g., using gestures or spoken commands) to create a new asset record for editing.

Figure 5:
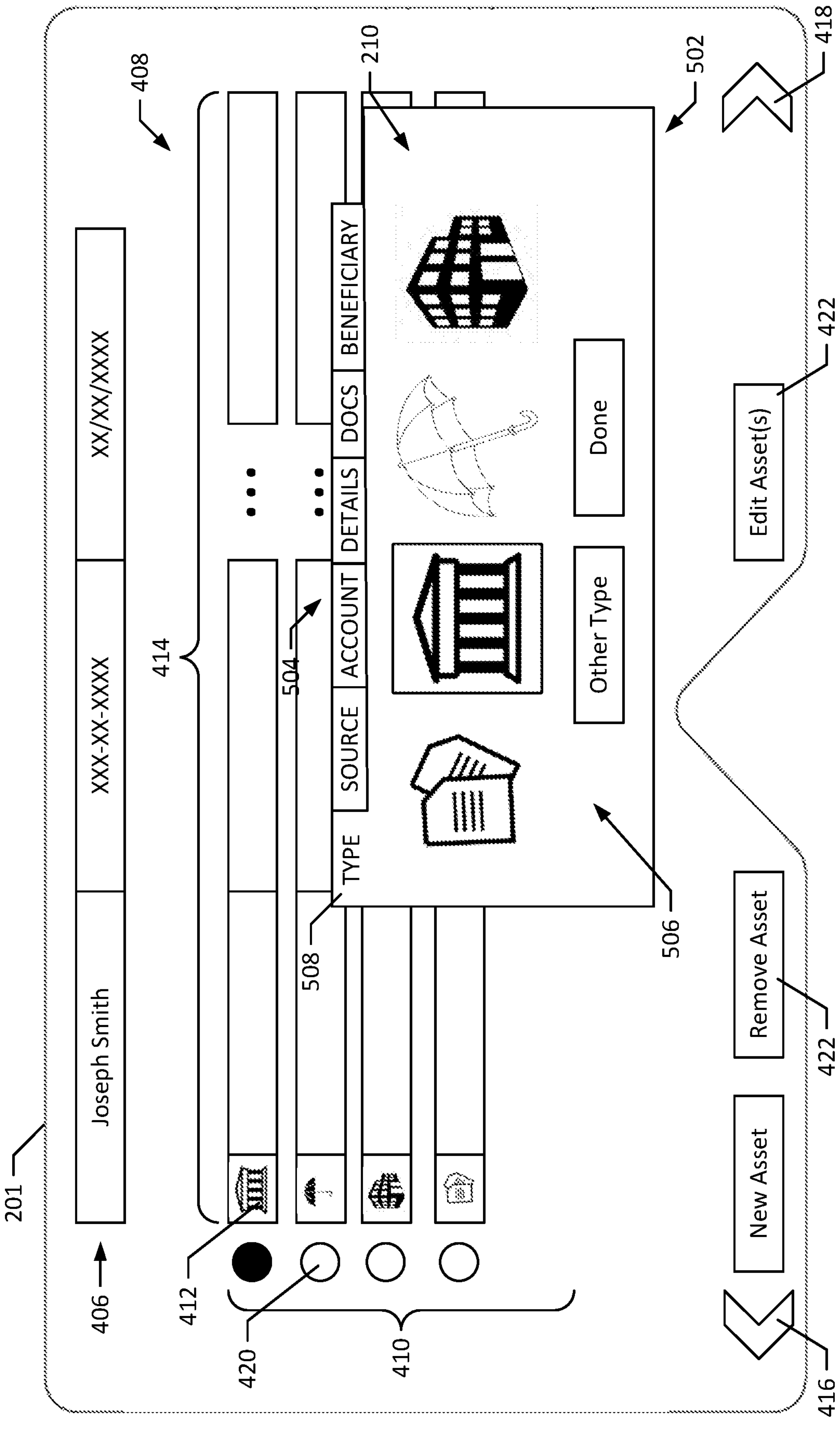
FIG. 5 illustrates an exemplary asset record user interface for obtaining and/or providing asset data using XR.

FIG. 5 illustrates an exemplary asset record UI 502 for obtaining or receiving, and/or providing, asset data for an asset record using XR. The headset 201 worn by a person (e.g., one of the persons 106, 122, 132) may present or provide the UI 502 in an XR environment presented or provided using the XR headset 201. The person may use the asset record UI 502 to interact virtually with the server(s) 110 using XR to provide asset data. In the example shown, the UI 502 is overlaid on the UI 402. However, it may be shown separately and/or differently. The exemplary UI 502 may be activated when, for example, a graphic 412 is virtually activated (e.g., using gestures or spoken commands). The UI 502 may include any number and/or type(s) of interface elements including tabs 504, and selectable elements 506, for example.

The exemplary UI 502 relates to providing data for an asset record. In the depicted example, a selected tab 508 enables the person to virtual select (e.g., using gestures or spoken commands) an asset type (e.g., document, bank account, insurance policy, employee benefit, etc.) for the asset record by virtually selecting (e.g., using gestures or spoken commands) one of the selectable elements 506. The person may select other tabs 504 to provide other asset data for the asset record.

Figure 6:
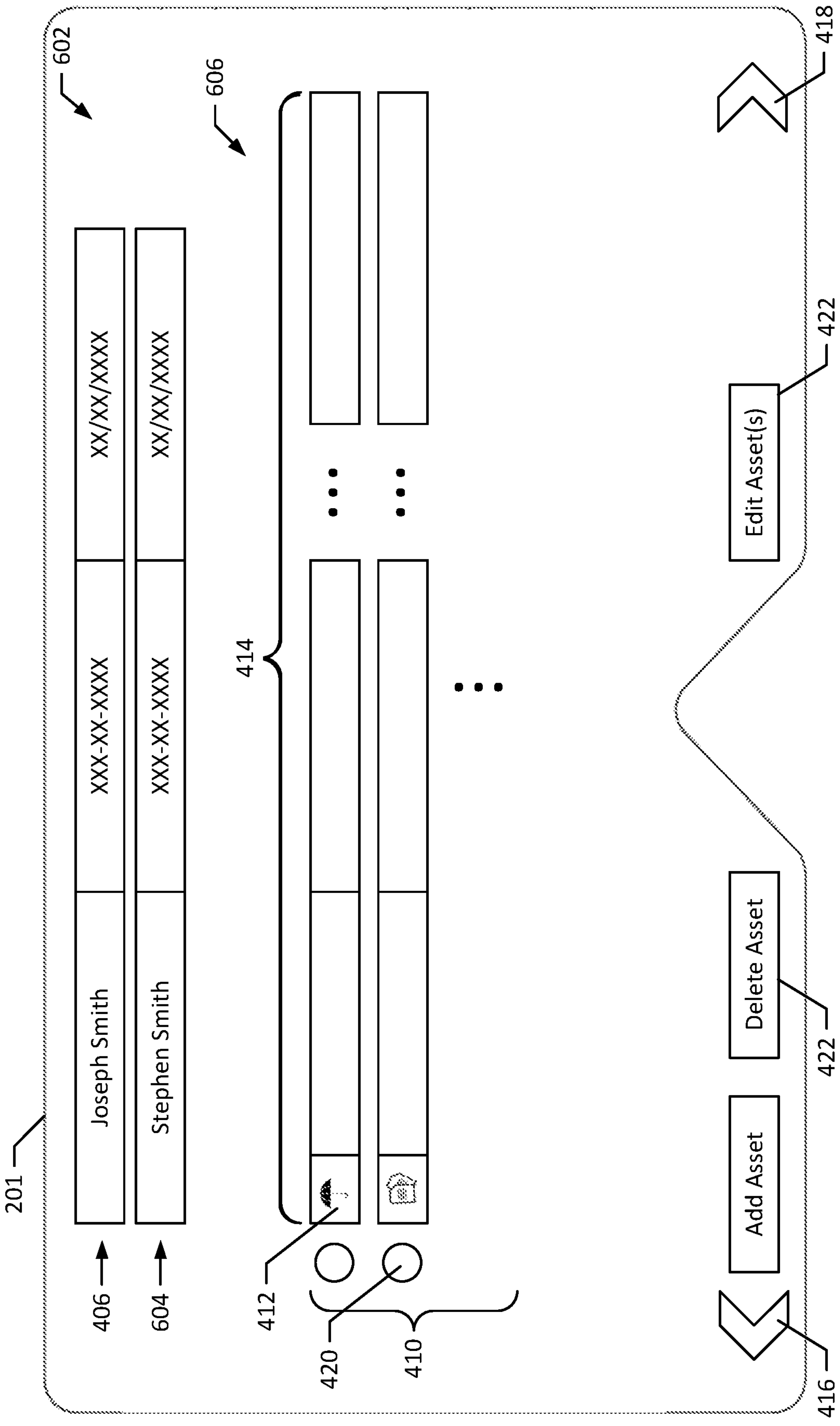
FIG. 6 illustrates an exemplary estate disposition user interface for disposing of estate assets using XR.

FIG. 6 illustrates an exemplary estate disposition UI 602 for obtaining or receiving, and/or providing, instructions related to disposing estate assets using XR. The headset 201 worn by a person (e.g., one of the persons 122, 132) may present or provide the UI 602 in an XR environment using the headset 201, such that the person may interact virtually with the server(s) 110 using XR to dispose of estate asset.

The exemplary UI 602 is similar to UI 402 of FIG. 4, and like elements in FIGS. 4 and 6 are designated with like reference numerals. The description of like elements will not be repeated here. Instead, the interested reader is referred to the descriptions of like elements provided in connection with FIG. 4.

The exemplary UI 602 includes a plurality of display boxes 604 displaying personal data for the person that is disposing assets (e.g., an executor or beneficiary), such as name, social security number, and date of birth. However, alternative and/or additional data may be shown. In some embodiments, the person cannot change data displayed in the boxes 604.

The exemplary UI 602 displays a table of estate data 606 that may be a subset of the table of estate data 408 of FIG. 4. The server(s) 110 may select the subset based upon permissions associated with the person related to which asset records the person authorized to view and/or which assets the person is authorized to dispose.

Figure 7:
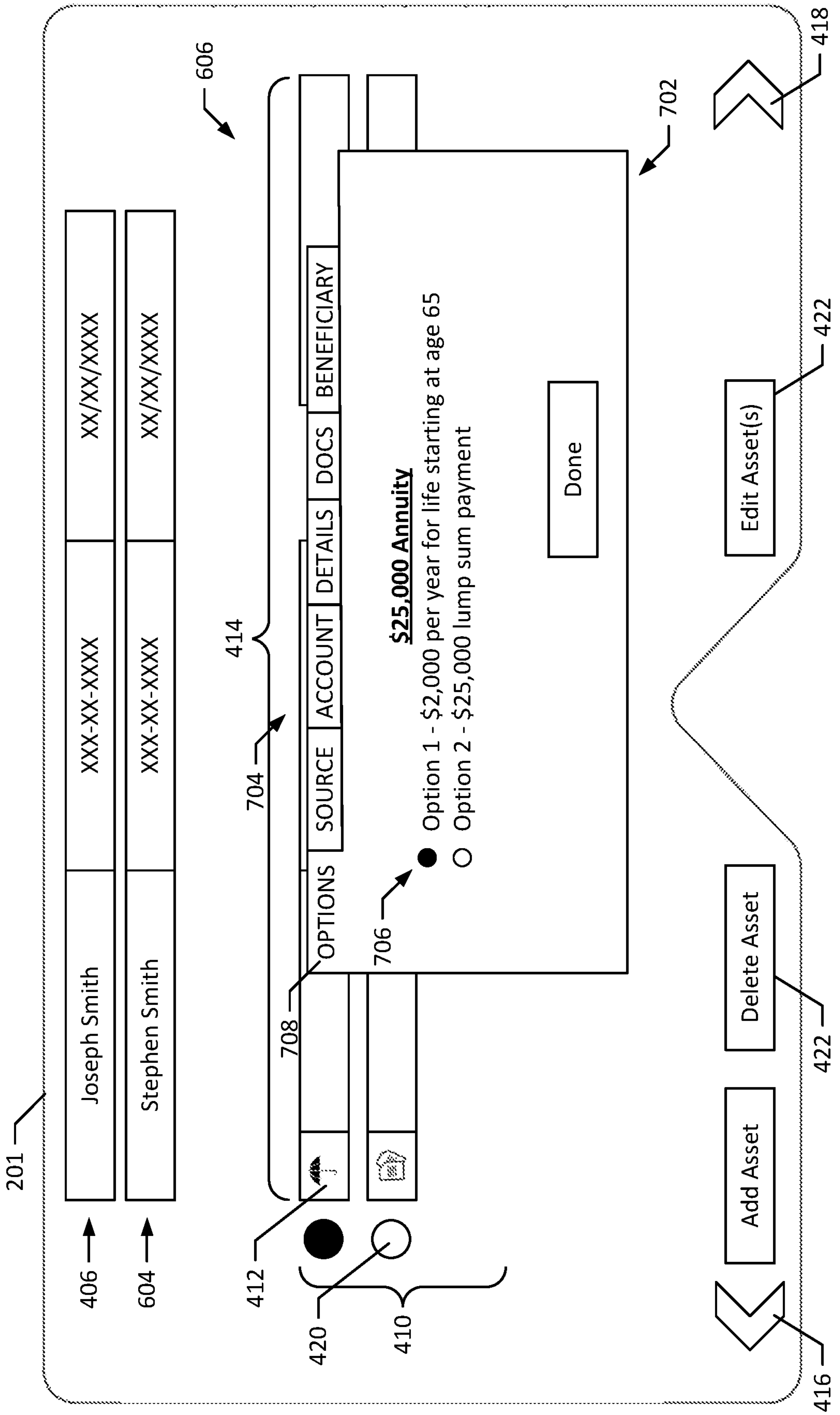
FIG. 7 illustrates an exemplary asset disposition user interface for disposing of an estate asset using XR.

FIG. 7 illustrates an exemplary asset disposition UI 702 for obtaining or receiving, and/or providing, instructions related to disposing estate assets using XR. The headset 201 worn by a person (e.g., one of the persons 122, 132) may present or provide the UI 702 in an XR environment using the headset 201, such that the person may interact virtually with the server(s) 110 using XR to dispose of assets. The exemplary UI 702 may be activated when, for example, a graphic 412 is virtually activated (e.g., using gestures or spoken commands). The UI 702 may include any number and/or type(s) of interface elements including tabs 704, and check boxes 706, for example.

The exemplary UI 702 is similar to UI 602 of FIG. 6, and like elements in FIGS. 4, 6, and 7 are designated with like reference numerals. The description of like elements will not be repeated here. Instead, the interested reader is referred to the descriptions of like elements provided in connection with FIGS. 4 and 6.

The exemplary UI 702 relates to obtaining or receiving, and/or providing, information related to asset disposal options for an asset, and receiving a selection of a disposal option for the asset for execution. In the depicted example, a selected tab 708 enables a person (e.g., one of the persons 122, 132) to virtually review disposal options for an asset, and virtually select a disposal option for the asset (e.g., using gestures or spoken commands to check one of the boxes 706) for execution. The person may select other tabs 704 to review other data for the asset record.

Exemplary Computer-Implemented Methods

Figure 8:
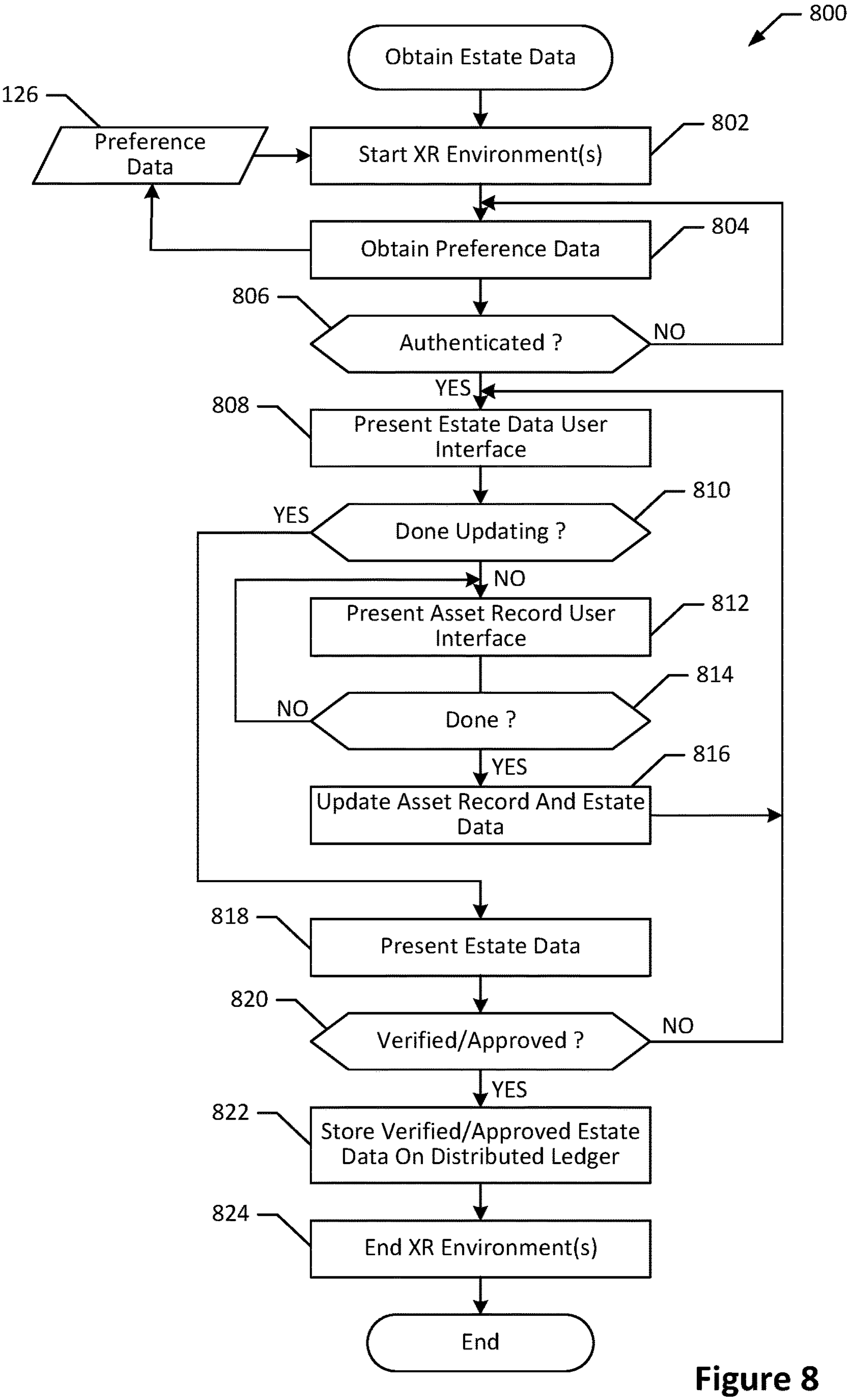
FIG. 8 is a flowchart for an exemplary computer-implemented method for obtaining or receiving estate data using XR.

FIG. 8 is a flowchart representative of an exemplary computer-implemented method 800 representing hardware logic, machine-readable instructions, or software that may be implemented or executed by the server(s) 110 to use XR for obtaining or receive estate data (e.g. the estate data 108), as disclosed herein. Any or all of the blocks of FIG. 8 may be executable program(s) or portion(s) of executable program(s) embodied in software and/or machine-readable instructions stored on non-transitory, machine-readable storage media for execution by the server(s) 110 or, more generally, one or more processors, such as the processor 1202 of FIG. 12. Additionally and/or alternatively, any or all of the blocks of FIG. 8 may be implemented by one or more hardware circuits structured to perform the corresponding operation(s) without executing software or instructions. The method 800 is described below with reference to various components or parties of FIG. 1.

The computer-implemented method 800 may start with the server(s) 110 generating, and providing or presenting one or more XR environments using one or more devices associated with a person 106 (block 802). The devices may be non-XR devices and/or XR devices. When they are available, one or more aspects of the one or more XR environments may be based upon, or in accordance with, preference data for a person (e.g., the preference data 126, 146 for the persons 106, 132). The preference data may include personal data and/or XR preferences (e.g., social media account information, metaverse preferences and location information, or avatar preferences or information).

Otherwise, the computer-implemented method 800 may present or provide, using the XR environments, one or more preference input UIs (e.g., one of the exemplary UIs 202 or 302) to obtain preference data for the person (block 804), and control may return to block 802 to generate one or more personalized XR environment(s) (e.g., one of the XR environments 104, 130) that are customized, personalized, and/or configured according to, or based upon, the preference data, and to provide or present the one or more personalized XR environment(s) on one or more XR devices (e.g., one of the XR devices 102, 124, 134) associated with the person (block 802).

If the server(s) 110 cannot authenticate the person (block 806), control may return to block 804 to get updated personal data.

The server(s) 110 may present or provide, using the XR environment(s), one or more estate data UIs (e.g., the exemplary UI 402) that present or display one or more depictions of estate data (e.g., the estate data 108) for the person (block 808).

The computer-implemented method 800 may, when the person selects an asset record for review or modification (block 810), present or provide, using the personalized XR environment(s), one or more asset record UIs (e.g., the exemplary UI 502) that present or display asset data of the asset record, and enable the person to review and/or modify the asset data (block 812). The asset record UIs may be provided or presented until the person indicates they are done reviewing and/or modifying the asset data (block 814).

When they are done reviewing and/or modifying the asset data (block 814), the asset record and estate data may be updated (block 816), and control may return to block 808 to wait for more input(s) from the person 106.

Returning to block 810, when the person is done reviewing and/or modifying estate data (block 818), the computer-implemented method 800 may present or display the estate data again for review, verification, or approval (block 820). If approved (block 820), the server(s) 110 may cause the updated estate data to be stored on a distributed ledger, such as a blockchain (e.g., as described above in connection with FIG. 1) (block 822), the XR environment(s) may be ended (block 824), and control may exit from the method 800.

In some examples, the XR environment(s) 104 may include a virtual meeting between the person and another person, such as the representative 122, an avatar or representation thereof, or an avatar for a computer-generated virtual persona.

Figure 9:
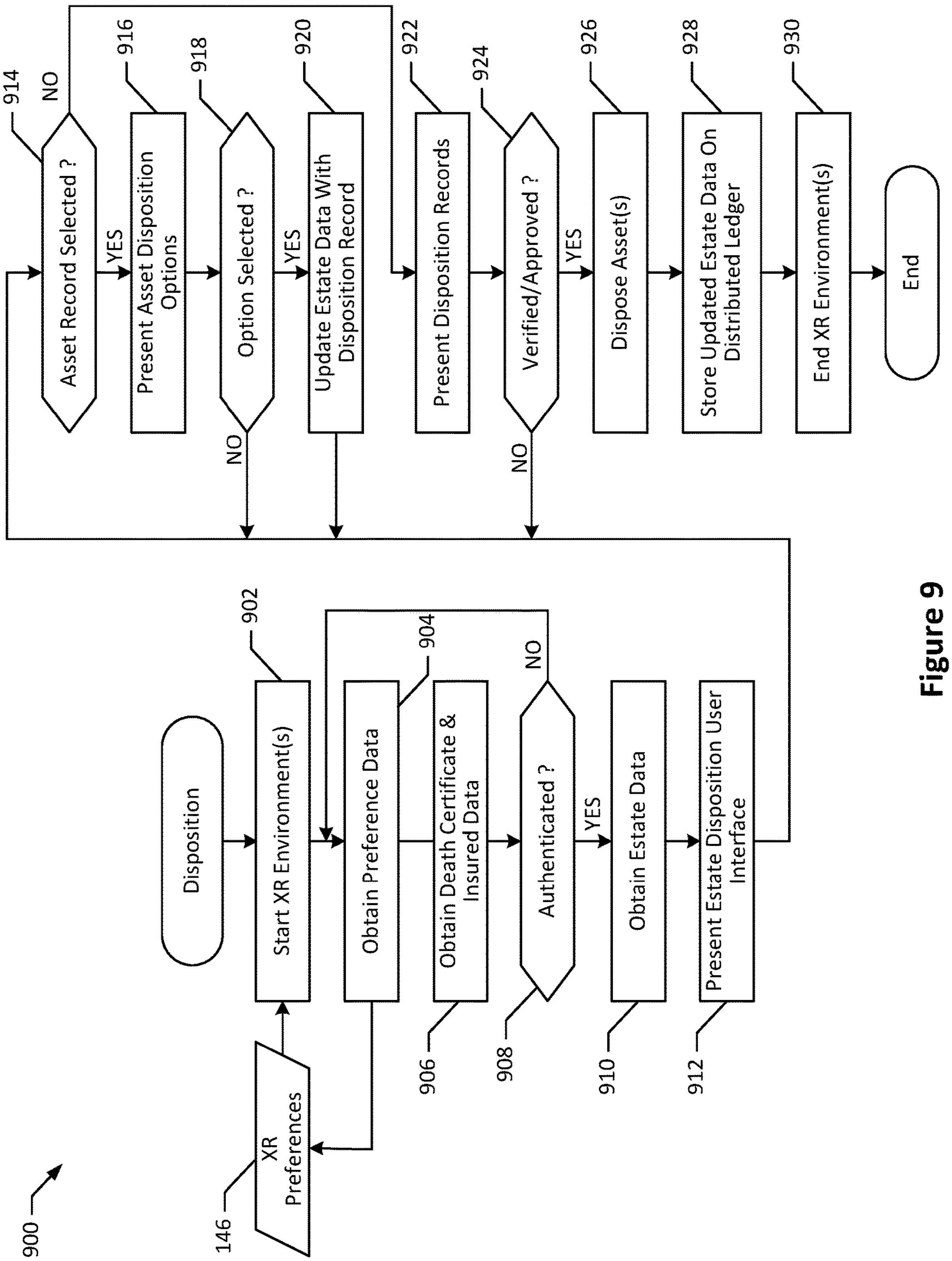
FIG. 9 is a flowchart for an exemplary computer-implemented method for obtaining or receiving, and/or providing, instructions related to disposing estate assets using XR.

FIG. 9 is a flowchart representative of an exemplary computer-implemented method 900 representing hardware logic, machine-readable instructions, or software that may be implemented or executed by the server(s) 110 for obtaining or receiving instructions related to disposing estate assets, as disclosed herein. Any or all of the blocks of FIG. 9 may be executable program(s) or portion(s) of executable program(s) embodied in software and/or machine-readable instructions stored on non-transitory, machine-readable storage media for execution by the server(s) 110 or, more generally, one or more processors, such as the processor 1202 of FIG. 12. Additionally and/or alternatively, any or all of the blocks of FIG. 9 may be implemented by one or more hardware circuits structured to perform the corresponding operation(s) without executing software or instructions. The method 900 is described below with reference to various components or parties of FIG. 1.

The computer-implemented method 900 may start with the server(s) 110 generating, and providing or presenting one or more XR environment(s) using one or more devices associated with a person (e.g., the person 132) (block 902). When they are available, one or more aspects of the one or more XR environments may be based upon, or in accordance with, preference data for the person (e.g., the preference data 146), such as personal data and/or XR preferences (e.g., social media account information, metaverse preferences and location information, or avatar preferences or information).

Otherwise, the computer-implemented method 900 may provide or present, using the XR environments, one or more preference input UIs (e.g., one of the exemplary UIs 202 or 302) to obtain preference data for the person (block 904), and control returns to block 902 to generate one or more personalized XR environment(s) (e.g., one of the XR environments 130) that are customized, personalized, and/or configured according to, or based upon, the preference data, and to provide or present the one or more personalized XR environment(s) on one or more XR devices (e.g., one of the XR devices 134) associated with the person (block 902).

The computer-implemented method 900 may including obtaining a death certificate and/or data related to a deceased person (i.e., the person 106) (block 906). If the server(s) 110 cannot authenticate the person and the death of the deceased person (block 908), control may return to block 904 to get updated personal data. For example, the server(s) 110 may determine whether the person is authorized to access an account associated with the person 106 or the deceased person, or to access the estate data for the deceased person (e.g., the estate data 108).

When the person is authenticated (block 908), the server(s) 110 may obtain the estate data, or an authorized subset thereof (block 910), and may present or display, using the XR environment(s), one or more estate disposition UIs (e.g., the UI 602) that present or display one or more depictions of the estate data for the person (block 912).

If the person selects an asset record (block 914), the server(s) 110 may provide or present, using the XR environment(s) 130, one or more asset disposition UIs (e.g., the exemplary UI 702) (block 916). When the person selects a disposal option for the asset (block 918), a disposition record may be added to the estate data, and the asset record may be updated to include an indication that the asset has been disposed and/or how it was disposed (block 920), and control return may to block 914.

When the person is done reviewing the estate data and/or disposing assets (block 914), the computer-implemented method 900 may present or display the disposition records for review, verification, or approval (block 922). If approved (block 924), the server(s) 110 may cause the selected dispositions to be executed (block 926), and cause the updated estate data to be stored on a distributed ledger, such as a blockchain (e.g., as described above in connection with FIG. 1) (block 928), the XR environment(s) may be ended (block 930), and control may exit from the method 900.

Exemplary Virtual Meetings

Figure 10:
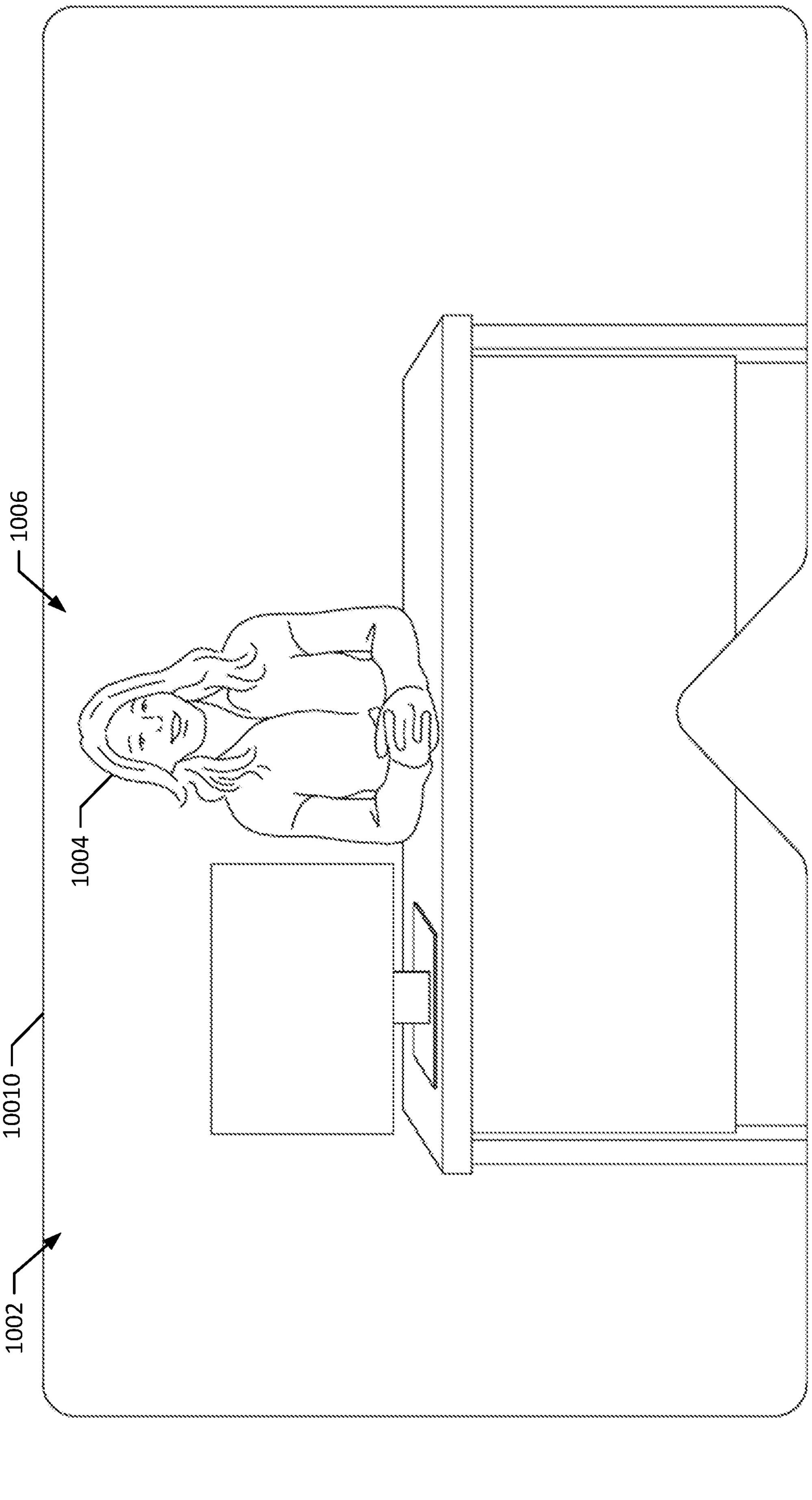
FIG. 10 illustrates an exemplary virtual meeting of a first person with a second person from the perspective of the first person.

FIG. 10 illustrates an exemplary XR-based virtual meeting 1002 of a first person (e.g., the person 106 or 132) with an avatar 1004 for, or another representation of, a second person (e.g., the representative 122) from the perspective of the first person. As depicted, the first person's perspective 1006 of the virtual meeting 1002 may be provided or presented using an XR headset 1008 worn by the first person, such that the first person may interact virtually with the avatar 1004 for the second person.

Figure 11:
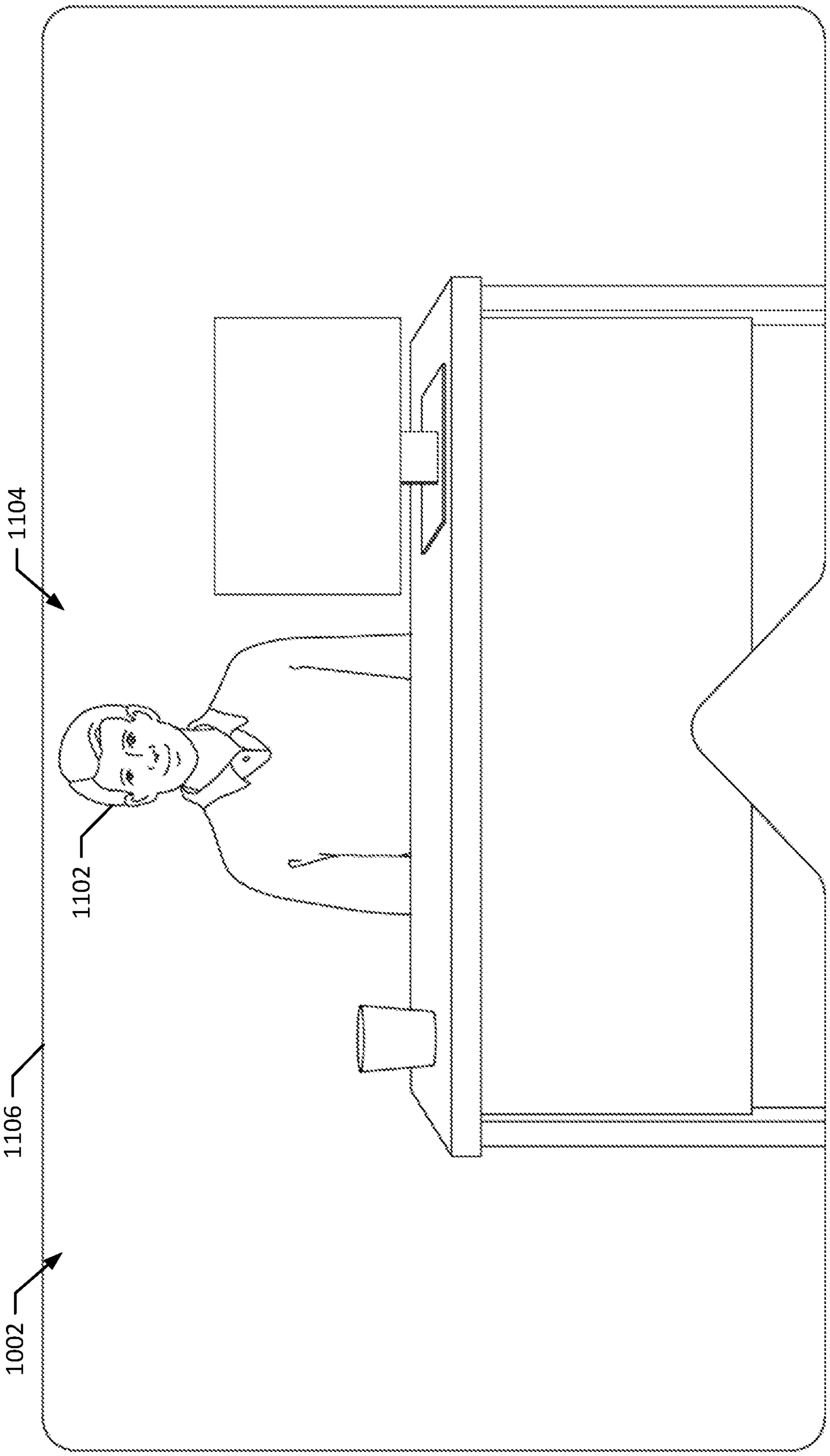
FIG. 11 illustrates the exemplary virtual meeting of FIG. 10 from the perspective of the second person.

FIG. 11 illustrates the exemplary XR-based virtual meeting 1002 of FIG. 10 from the perspective of the second person looking at an avatar 1102 for, or another representation of, the first person. As depicted, the second person's perspective 1104 of the virtual meeting 1002 may be provided or presented using an XR headset 1106 worn by the second person, such that the second person may interact virtually with the avatar 1102 for the first person. In some embodiments, the virtual meeting 1002 may occur in a virtual scene or location that mimics (e.g., is constructed or generated to look similar to) an actual person-to-person meeting in an actual scene or location. Exemplary virtual scenes or locations include a virtual office, a virtual meeting space, a virtual bench overlooking a virtual ocean, virtually sitting side-by-side on a virtual couch in a virtual living room, or virtually walking side-by-side through virtual woods. In some embodiments, a person may provide a description, image, or video of an actual scene or location (e.g., of a person's living room including a couch) that the server(s) 110 may use to generate a corresponding virtual scene or location.

In one example, the first person may be a beneficiary, the second person may be an insurance representation, and the virtual meeting may represent a one-on-one chat of the first person with the insurance representative in a living room. By meeting in a virtual scene or location described or selected the first person (see below), the first person may be made more comfortable when they meet the insurance representative following the death of a family member, friend or acquaintance (e.g., the person 106). The insurance representative may during the virtual meeting (i) express their sympathy and condolences on the death of the deceased; (ii) walk or guide the first person through, for example, a will or insurance policy; (iii) present or discuss disposal options for the insurance policy; and/or (iv) receive a selection of a disposal option for the insurance policy. In some examples, a virtual meeting may represent a virtual meeting of one or more persons (e.g., multiple beneficiaries) with an insurance representative. In such examples, the one or more persons may wait in a virtual waiting room or lobby until they have all arrived, and the virtual meeting with the insurance representative may begin. In some embodiments, the server(s) 110 may present or provide materials related generally to insurance, beneficiaries, estates, an insurance company, for example, to persons waiting to virtually meet with an insurance representative. Additionally and/or alternatively, the server(s) 110 may provide or present videos, puzzles, games, etc. to help pass the time until the virtual meeting may begin.

In the depicted virtual meeting 1002, the first person interacts with the second person via the latter's avatar 1004. However, the avatar 1004 need not be associated with an actual person. For example, the server(s) 110 may generate a computer-generated persona of a computer-generated virtual person, such that the first person may instead interact with a visual avatar for the virtual person. Additionally and/or alternatively, the server(s) may provide or present a voice bot or chatbot for the virtual person with which the first person may interact using spoken, written, or typed words. While example uses of the virtual meeting 1002 have been described, the virtual meeting 1002 may instead be used for other purposes.

The server(s) 110 may obtain metaverse or XR preferences for the first person, and customize, personalize, generate, or configure the virtual meeting based upon, or according to, the metaverse or XR preferences. Exemplary metaverse or XR preferences includes one or more of any preferences related to XR or metaverse experiences and interactions including, for example, virtual interaction preferences (e.g., prefer to use VR over AR, only use AR, preferred avatar, a metaverse preference, a preferred metaverse scene, a preferred avatar, a unique metaverse identifier, a preferred XR device, a preferred XR device type, an XR identifier, preferred metaverse or other setting for a virtual meeting, etc.), type(s) of or identifier(s) for the person's XR device(s), willingness to hold virtual meetings (rather than real-world meetings) with another person, where or how the person prefers to meet (e.g., virtual home or virtual office in a metaverse, with the representative's avatar in person's actual home or place of business using AR, or in another setting such as outdoors, at the beach, in the woods, during a stroll, etc.), preferred time(s) or days-of-week to meet, etc.

In some embodiments, the server(s) 110 may notify or invite persons to virtual meetings according to a person's notification preferences. For example, the server(s) 110 may send to a person a text notification with a link to initiate a virtual meeting. In some embodiments, the notification or invitation for a virtual meeting may correspond to a scheduled time for the virtual meeting, such as when two actual persons will participate in the virtual meeting. However, some notifications or invitations may be activated at any day or time, such as when a person will be the only actual person in a virtual meeting. In some embodiments, the preferences may be provided to the server(s) 110, manually or automatically, when a person responds to a notification for, or an invitation to, a virtual meeting.

Exemplary Processing Platform

Figure 12:
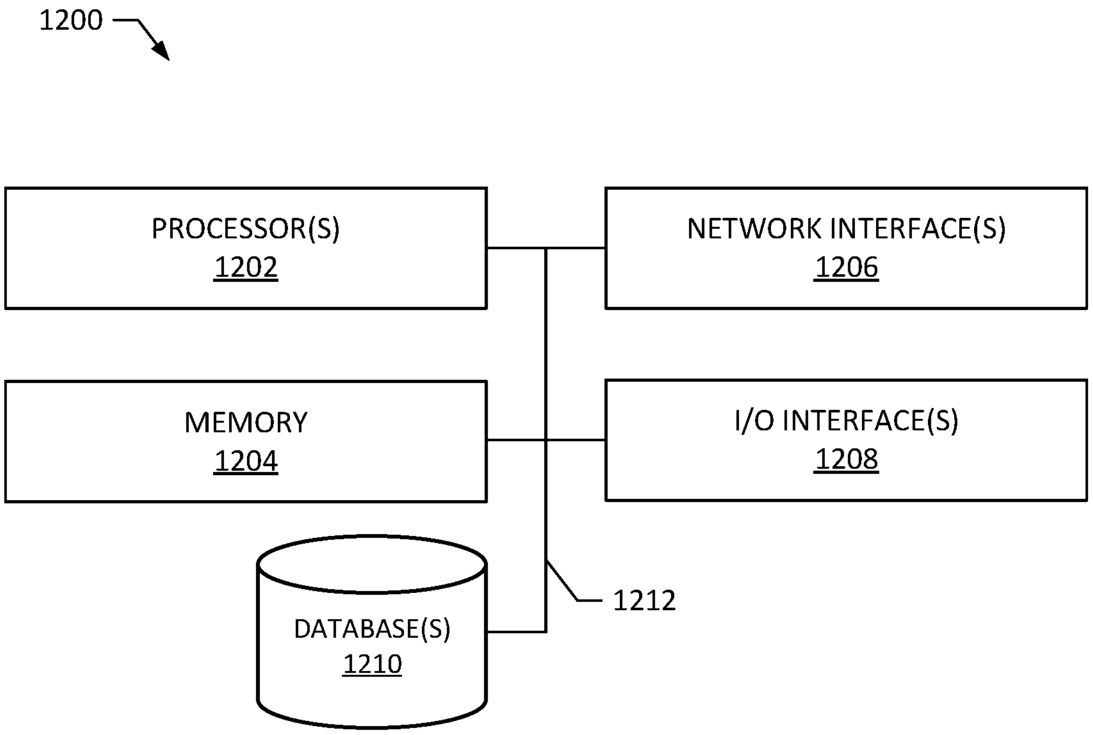
FIG. 12 is a block diagram of an exemplary processing platform for implementing example methods and operations described herein.

FIG. 12 is a block diagram representative of an exemplary processing platform 1200 that may be used to implement one or more components of the exemplary XR devices 102 and 134, the server(s) 110, or, more generally, the exemplary XR system 100 of FIG. 1. The exemplary processing platform 1200 may be capable of executing instructions to, for example, implement operations of the exemplary methods described herein, as may be represented by the flowcharts of the drawings that accompany this description. Other exemplary logic circuits capable of implementing operations of the exemplary methods described herein include field programmable gate arrays (FPGAs) and application specific integrated circuits (ASICs).

The exemplary processing platform 1200 of FIG. 12 may include a processor 1202 such as, for example, one or more microprocessors, controllers, and/or any suitable type of processor. The exemplary processing platform 1200 of FIG. 12 may include memory (e.g., volatile memory, non-volatile memory) 1204 accessible by the processor 1202 (e.g., via a memory controller). The exemplary processor 1202 may interact with the memory 1204 to obtain, for example, machine-readable instructions stored in the memory 1204 corresponding to, for example, the operations represented by the flowcharts of this disclosure. Additionally or alternatively, machine-readable instructions corresponding to the exemplary operations described herein may be stored on one or more removable media (e.g., a compact disc, a digital versatile disc, removable flash memory, etc.) that may be coupled to the processing platform 1200 to provide access to the machine-readable instructions stored thereon.

The exemplary processing platform 1200 of FIG. 12 may include one or more communication interfaces such as, for example, one or more network interface 1206, and/or one or more input/output (I/O) interfaces 1208. The communication interface(s) enable the processing platform 1200 of FIG. 12 to communicate with, for example, another device or system (e.g., the exemplary XR devices 102, 124, and 134, and the server(s) 110), datastore, database, and/or any other machine.

The exemplary processing platform 1200 of FIG. 12 may include the network interface(s) 1206 to enable communication with other machines (e.g., the exemplary XR devices 102, 124, and 134, the server(s) 110) via, for example, one or more networks, such as the network(s) 148. The exemplary network interface 1206 may include any suitable type of communication interface(s) (e.g., wired and/or wireless interfaces) configured to operate in accordance with any suitable communication protocol(s). Exemplary network interfaces 1206 may include a TCP/IP interface, a WiFi™ transceiver (e.g., according to the IEEE 802.11x family of standards), an Ethernet transceiver, a cellular network radio, a satellite network radio, or any other suitable interface based upon any other suitable communication protocols or standards.

The exemplary processing platform 1200 of FIG. 12 may include the input/output (I/O) interface(s) 1208 (e.g., a Bluetooth® interface, an NFC interface, a USB interface, a serial interface, an infrared interface, etc.) to enable receipt of user input (e.g., from input controls of the XR devices 102, 124, and 134, a touch screen, keyboard, mouse, touch pad, joystick, trackball, microphone, button, etc.) and communication of output data (e.g., visual indicators, instructions, data, images, etc.) to the user (e.g., via a display, speaker, printer, etc.).

Exemplary Personalized Virtual User Experiences

The present embodiments may also relate to, inter alia, collecting data, including personal data and virtual user experience preferences, and data related to insurance policies, wills, homes, vehicles, and personal belongings. The data may be collected via several sources, including a virtual headset (e.g., an AR, VR, or XR headset or smart glasses or smart contacts, and/or an associated chat or voice bot), and analyzed by a server or processor to provide practical applications and virtual user experiences to users.

More particularly, the present embodiments disclose systems and methods that may relate to virtual headsets and virtual user experiences. For instance, digitalized data related to (i) insureds and beneficiaries, and their virtual user experience preferences; (ii) life, auto, home, and/or personal articles insurance policies; (iii) wills and trusts; (iv) personal assets, such as homes, autos, financial accounts, or personal articles; and/or (iv) damaged insured assets, such as damaged vehicles, homes, and personal articles damaged as a result of insurance-related events (e.g., vehicle collisions, fire, wind, water, hail, thunderstorms, wildfires, hurricanes, tornadoes, etc.), may be collected and generated, at least in part, via virtual headsets. The data collected may be utilized to create personalized virtual user experiences that are presented or otherwise experienced digitally and/or audibly via virtual headsets.

The personalized virtual user experiences may relate to (i) the disposition of assets via a life insurance policy or will; (ii) generating a homeowners, auto, or personal articles insurance quote; (iii) preparing and/or handling/processing a homeowners, auto, or personal articles insurance claim based upon data collected related to (a) insurance policies, and (b) damaged insured assets; (iv) preparing virtual reconstructions of the insurance-related event for viewing and altering via virtual headsets; (v) preparing virtual representations of home remodeling, home remodeling options, repair or replacement options and materials/cost options for viewing and approving via virtual headsets; (vi) scheduling repair or replacement contractors via virtual headsets; and other applications discussed herein.

Virtual Agent'S Office (Metaverse)

Certain embodiments may utilize a virtual headset (such as an AR/VR/XR headset, or smart glasses), chatbot and/or avatar to submit an insurance claim using visuals/icons, such as icons related to selecting damaged insured asset (home, vehicle, personal article), type of damage (collision, fire, water, wildfire, tornado, hail, wind, etc.), location of damage, etc. The customer may use the virtual headset to navigate about the virtual agent's office, such as to prepare a claim or receive a quote.

It should be noted that a life insurance claimant will be the beneficiary, not the insured; as a result, the beneficiary may not have a pre-existing relationship with the insurance provider. So, this immersive experience may be a good way to bridge the "personal touch" and the digital during a difficult time.

The insured may utilize the virtual headset to collect and/or create digitalized life insurance and/or will/trust information of the insured to identify items bequeathed and beneficiaries. A hybrid personalized relationship may be created with beneficiaries by allowing each beneficiary to use a virtual headset and/or chatbot to enter their personal information; preferred financial accounts; preferences for virtual agent or actual agent interaction(s); and/or preferences for metaverse location or virtual area/home interaction. For instance, the beneficiary may, via the virtual headset, select whether they prefer to summon a virtual agent/chat bot, or an actual agent using visual menus/icons or verbally/audible interaction with a chat bot (e.g., if they would like to discuss life insurance policies in general, etc.). Upon the death of the insured, a beneficiary may digitalize a death certificate or other proof of death using a virtual headset.

In some embodiments, the virtual headset, and graphics presented thereon, may walk or guide the beneficiary(s) through the life insurance benefits and/or will or trust using the virtual headset. Additionally, each beneficiary may select one or more their financial account(s) for transferring funds into using the virtual headset for financial bequeaths.

Exemplary Personalized Virtual User Experience

Figure 13:
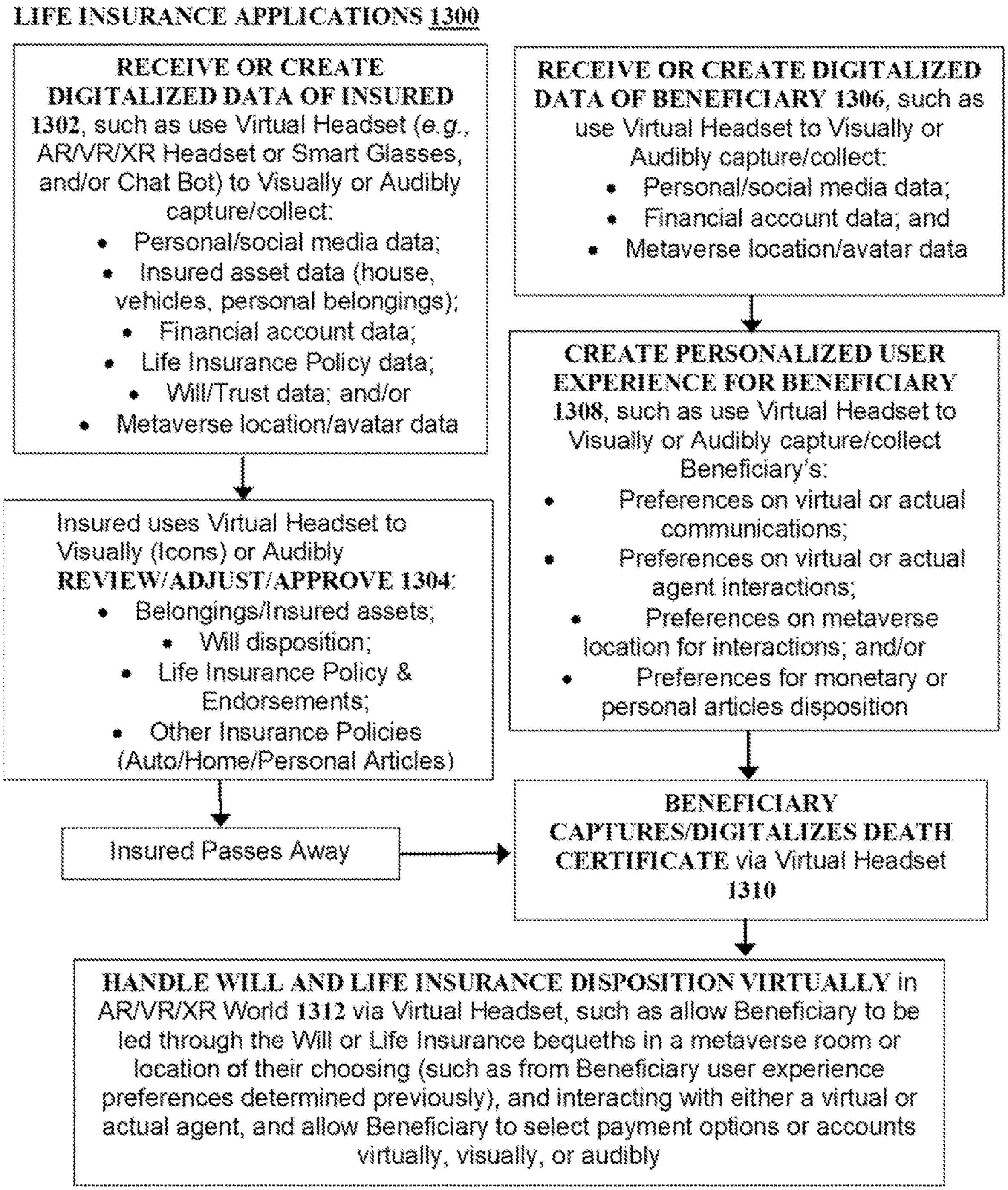
FIG. 13 illustrates an exemplary computer-implemented method utilizing a personalized virtual user experience to dispose of assets identified in a life insurance policy, will, or trust.

FIG. 13 illustrates a computer-implemented method utilizing a personalized virtual user experience to dispose of assets identified in a life insurance policy, will, or trust 1300. The computer-implemented method 1300 may be implemented via one or more local or remote processors, sensors, cameras, transceivers, servers, memory units, chat or voice bots, and/or virtual headsets. The virtual headsets may include AR (Augmented Reality) glasses or headsets, VR (Virtual Reality) glasses or headsets, XR (eXtended Reality) glasses or headsets, or other smart glasses. The headsets or glasses may include audible functionality, such as chat or voice bot functionality, or be configured to work with an associated chat or voice bot, such as a chat or voice bot working with a smart home controller and located within the home.

The computer-implemented method 1300 may include, via one or more local or remote processors, sensors, cameras, transceivers, servers, memory units, chat bots, and/or virtual headsets: (1) receiving or creating digitalized data of an insured 1302, such as via a virtual headset and/or chat bot; (2) allowing the insured to use a virtual headset (and/or chat bot) to visually or audibly review, adjust, and/or approve a listing of assets, and disposition of assets established via a life insurance policy or will 1304; (3) receiving or creating digitalized data of a beneficiary 1306, such as via a virtual headset and/or chat bot; (4) creating a personalized virtual user experience for the beneficiary 1308, such as via a virtual headset and/or chat bot; (5) capturing or receiving a digital death certificate from the beneficiary's virtual headset 1310; and/or (6) handling or processing the disposition of assets identified in a will or life insurance policy in a virtual world via the virtual headset 1312, such as using a virtual headset and/or chat bot. The method may include additional, less, or alternate actions, including those discussed elsewhere herein.

The computer-implemented method 1300 may include, via one or more local or remote processors, sensors, cameras, transceivers, servers, memory units, chat bots, and/or virtual headsets, receiving or creating digitalized data of, or associated with, the insured 1302. For instance, the insured may use a virtual headset (such as smart or virtual glasses or headset; or an AR, VR, or XR headset) and/or chatbot to virtually or audibly capture, collect, and/or digitalize: (i) personal data, including virtual user experience preferences; (ii) social media data; (iii) insured asset data (e.g., house(s), vehicle(s), and personal belonging data); (iv) financial account data; (v) life insurance data; (vi) will and/or trust data; and/or (vii) metaverse location and/or avatar data (such as a virtual location owned or associated with the insured, and a virtual avatar or other virtual character of, or associated with, the insured).

The computer-implemented method 1300 may include, via one or more local or remote processors, sensors, cameras, transceivers, servers, memory units, chat bots, and/or virtual headsets, allowing the insured to review, adjust, modify, and/or approve the digitalized data of the insured 1304. For instance, the insured may use a virtual headset to visually (such as via icons or other graphics) or audibly review, adjust, and/or approve belongings and insured assets (including home features, vehicle features, etc.); will disposition and bequeaths; life insurance policy terms, conditions, and endorsements; and/or other insurance policies and conditions (e.g., home, auto, and personal articles insurance).

The computer-implemented method 1300 may include, via one or more local or remote processors, sensors, cameras, transceivers, servers, memory units, chat bots, and/or virtual headsets, receiving or creating digitalized data of a beneficiary 1306. For instance, a life insurance or will beneficiary identified in the digitalized data of an insured (such as identified within digitalized will or life insurance data) may use a virtual headset to capture or collect (i) personal data and virtual user experience preference data; (ii) social media data; (iii) financial account data; and/or (iv) metaverse location and avatar data (such as a beneficiary's home or other preferred location in the metaverse).

The computer-implemented method 1300 may include, via one or more local or remote processors, sensors, cameras, transceivers, servers, memory units, chat bots, and/or virtual headsets, creating a personalized virtual user experience for the beneficiary 1308. For instance, the beneficiary may use a virtual headset (and/or chat bot) to visually and/or audibly capture, collect, and/or identify the beneficiary's preferences on virtual or actual communications; preferences on virtual or actual agent interactions; preferred metaverse location(s) for virtual interactions; and/or preferences for monetary or personal articles disposition.

In the event that the insured passes away, the computer-implemented method 1300 may include, via one or more local or remote processors, sensors, cameras, transceivers, servers, memory units, chat bots, and/or virtual headsets, the beneficiary capturing and/or digitalizing a death certificate or other proof of the insured passing away 1310. For instance, the beneficiary may capture or otherwise digitalize a death certificate via a virtual headset.

The computer-implemented method 1300 may include, via one or more local or remote processors, sensors, cameras, transceivers, servers, memory units, chat bots, and/or virtual headsets, handling or otherwise processing will and life insurance asset disposition virtually in a virtual world 1312. For instance, the beneficiary may be led through a will or life insurance bequeaths in a metaverse room or location of their choosing (such as from the beneficiary virtual user experience preferences determined previously), interacting with either a preferred virtual or actual agent, and allowing the beneficiary to select payment options or accounts virtually, visually, or audibly.

Exemplary Life Insurance Applications

FIG. 14 illustrates a computer-implemented method utilizing a personalized virtual user experience to dispose of assets identified in a life insurance policy, will, or trust 1400. The computer-implemented method 1400 may be implemented via one or more local or remote processors, sensors, cameras, transceivers, servers, memory units, chat or voice bots, and/or virtual headsets. The virtual headsets may include AR (Augmented Reality) glasses or headsets, VR (Virtual Reality) glasses or headsets, XR (eXtended Reality) glasses or headsets, or other smart glasses. The headsets or glasses may include audible functionality, such as chat or voice bot functionality, or be configured to work with an associated chat or voice bot, such as a chat or voice bot working with a smart home controller and located within the home.

The computer-implemented method 1400 may include, via one or more local or remote processors, sensors, cameras, transceivers, servers, memory units, chat bots, and/or virtual headsets: (1) receiving or creating digitalized data of a life insurance policy (or will) 1402, such as via a virtual headset and/or chat bot; (2) receiving or creating digitalized data of a beneficiary 1404; (3) creating a personalized virtual user experience for the beneficiary 1406; (4) virtually or electronically notifying the beneficiary of the insured passing away 1408; and/or (5) handling or processing the life insurance or will disposition virtually in the virtual world, such as the metaverse 1410. The method may include additional, less, or alternate actions, including those discussed elsewhere herein.

For instance, the computer-implemented method 1400 may include, via one or more local or remote processors, sensors, cameras, transceivers, servers, memory units, chat bots, and/or virtual headsets, receiving or creating digitalized data of, or associated with, the insured 1402. For instance, the insured may use a virtual headset (such as smart or virtual glasses or headset; or an AR, VR, or XR headset) and/or chatbot to virtually or audibly capture, collect, and/or digitalize (i) personal data and virtual user experience preference data; (ii) social media data; (iii) insured asset data (e.g., house(s), vehicle(s), and personal belonging data); (iv) financial account data; (v) life insurance data; (vi) will and/or trust data; and/or (vii) metaverse location and/or avatar data (such as a virtual location owned or associated with the insured, and a virtual avatar or other virtual character of, or associated with the insured). The beneficiary information and name may be extracted from the digitalized data.

The computer-implemented method 1400 may include, via one or more local or remote processors, sensors, cameras, transceivers, servers, memory units, chat bots, and/or virtual headsets, receiving or creating digitalized data of a beneficiary 1404. For instance, a life insurance or will beneficiary identified in the digitalized data of an insured (such as identified within digitalized will or life insurance data) may use a virtual headset and/or chat bot to capture or collect (i) personal data and virtual user experience preference data; (ii) social media data; (iii) financial account data; and/or (iv) metaverse location and avatar data (such as a beneficiary's home or other preferred location in the metaverse).

The computer-implemented method 1400 may include, via one or more local or remote processors, sensors, cameras, transceivers, servers, memory units, chat bots, and/or virtual headsets, receiving or generating a notification of the insured's passing away 1408. Additionally or alternatively, the beneficiary may create a digitalized version of a death certificate, such as by using a virtual headset, or mobile device camera.

The computer-implemented method 1400 may include, via one or more local or remote processors, sensors, cameras, transceivers, servers, memory units, chat bots, and/or virtual headsets, handling or otherwise processing will and life insurance asset disposition virtually in a virtual world 1410. For instance, the beneficiary may be led through a will or life insurance bequeaths in a metaverse room or location of their choosing (such as determined from or identified within the beneficiary virtual user experience preferences determined previously), interacting with either a preferred virtual or actual agent, and allowing the beneficiary to select payment options or accounts virtually, visually, or audibly.

Virtual Crash Reconstruction for Headset Review

With some embodiments, vehicle crash data from vehicle sensors, vehicle telematics data, mobile device data, smart infrastructure data, and/or drones/aerial data associated with a vehicle crash may be collected from one or more data sources and local or remote sensors, transceivers, and processors. The insured or vehicle owner, driver, or passenger may collect additional vehicle crash data using a virtual headset, such as capturing images of each vehicle involved in the crash, the areas of the vehicle collision, and of each vehicle damaged.

The crash data collected may be utilized to generate a model or virtual crash reconstruction. The virtual crash reconstruction may be used to identify which AV (autonomous vehicle) or driver was at fault, or partially at fault, and/or determine other causes/factors (weather, construction, deer, etc.) contributing to the vehicle collision.

The virtual crash reconstruction may be downloaded or streamed to a virtual headset to facilitate and/or allow: (i) the insured and/or agent to review, adjust, and/or approve the accuracy of the virtual crash reconstruction; (ii) the claim handler to review or adjust the virtual crash reconstruction; and/or (iii) the insured and claim handler to view and/or adjust the virtual reconstruction together, and work together to build/confirm the reconstruction. Additionally or alternatively, the insured can utilize the virtual headset to build the reconstruction in real time as he or she describes the accident verbally or using movable icons.

The verified virtual crash reconstruction may be placed on, otherwise stored on, or streamed to, a blockchain for remote viewing to facilitate subrogation, claim processing, dispute resolution, etc. Certain embodiments may also use computer vision and/or connected infrastructure data to resolve disputes associated with insurance-related events.

Home Insurance-Related Events

In some embodiments, for home damage, such as fire or water damage, a budget for repair of the home and/or replacement of fixtures using the virtual headset and/or an associated chat bot. Data may be collected using a virtual headset (and/or home sensors, mobile device sensors, vehicle sensors, etc.). In some embodiments, home telematics or usage data (e.g., water or electricity usage and home occupancy data), and/or vehicle telematics data (acceleration, braking, cornering, location, etc.) may be utilized. ML may be utilized to identify problem(s), i.e., cause of the damage or potential damage, such as leaking pipes, faulty wiring, leaking roof, damaged foundation, etc., and/or to identify materials for repair/replacement. Virtual illustrations or graphical depictions may be created depicting potential problems and/or repair materials for display on the virtual headset.

Home Remodeling

In some embodiments, a virtual headset may be utilized to facilitate home remodeling, such as kitchen or bathroom remodeling. For instance, a customer may utilize a virtual headset to capture images of a house via a home walk-through. From the data collected, sizes and dimensions of rooms may be identified. Audible or visual instructions may be provided to the customer as where to capture more images using the virtual headset. The virtual headset may provide or offer views of several potential remodeled kitchens (or other rooms) with different materials (e.g., different floors, stoves, refrigerators, counter tops, windows, different paint colors, etc.) and display their different costs for each virtual remodel; and once a remodeling option is visually or audibly selected by the customer, the customer may select financing options via the virtual headset and/or associated chat bot.

Homeowners Insurance

As noted elsewhere, in some embodiments, a customer may use a virtual headset to capture images of the interior and exterior of a house via a home walk-through. From ML or other processor analysis of the data collected, a homeowners insurance quote, personal articles insurance quote, auto insurance quote, home loan, and/or other quote may be generated. For instance, from analysis of the data, an offer for a home loan may be generated. As an example, for parametric insurance, the capture of the home data via the virtual headset may be used as a trigger to have a home loan offer and/or homeowners insurance quote generated and then presented via the virtual headset.

From ML or other processor analysis of the home data collected, areas of risk to the home may be identified to generate risk mitigation recommendations and/or insurance discounts. The data may be analyzed to (1) determine insurance coverage needs/endorsements/riders, etc.; (2) identify gaps in coverage, e.g., identify a boat or a second vehicle stored on the property, or extra structure on the property, that is currently uninsured or underinsured; (3) determine an inventory of items/personal articles about the home (again, such as by using ML or other techniques); (4) generate an personal articles insurance quote; and/or (5) for parametric insurance: based on a trigger event, such as a home total loss (wildfire, fire, hurricane, tornado, etc.), (i) generate a list of replacement items for the insured to review, adjust, and/or approve for automatic purchasing of all (or individually selected) items for replacement using the virtual headset and/or chat bot, and/or (ii) generate a potential insurance claim for the cost of the inventory of the items (for payout) for insured's review, modification, and/or approval via the virtual headset and/or chat bot.

Home Risk Mitigation

As noted, with some embodiments, the customer may utilize the virtual headset to capture images of interior and exterior of house via home walk-through. After which, ML or other techniques may be utilized to identify sources of water damage and/or other risks, such as hoses or pipes breaking/leaking, water heaters, toilet connections, washing machine hoses, dishwasher hoses, etc. Processor analysis of the data collected may also be utilized to generate recommendations of potential fixes; display or otherwise visually represent fixes and/or repairs on the virtual headset; and generate potential discounts and display insurance savings on the virtual headset. Some embodiments may include partnering with various merchants to identify replacement and/or repair parts and their costs.

Certain embodiments may include utilizing processor analysis of the data collected to identify locations to position, and types of, lights and sensors to improve home security and other functionality.

The virtual headset may display the customer's house and images of risk to the house (such as trees, branches, potential ice, damaged shingles, etc.). Also, types of replacement roofing material may be identified, and an insurance discount may be depicted if the roofing materials are upgraded on the virtual headset.

Auto & Homeowners Insurance Applications

Figure 15:
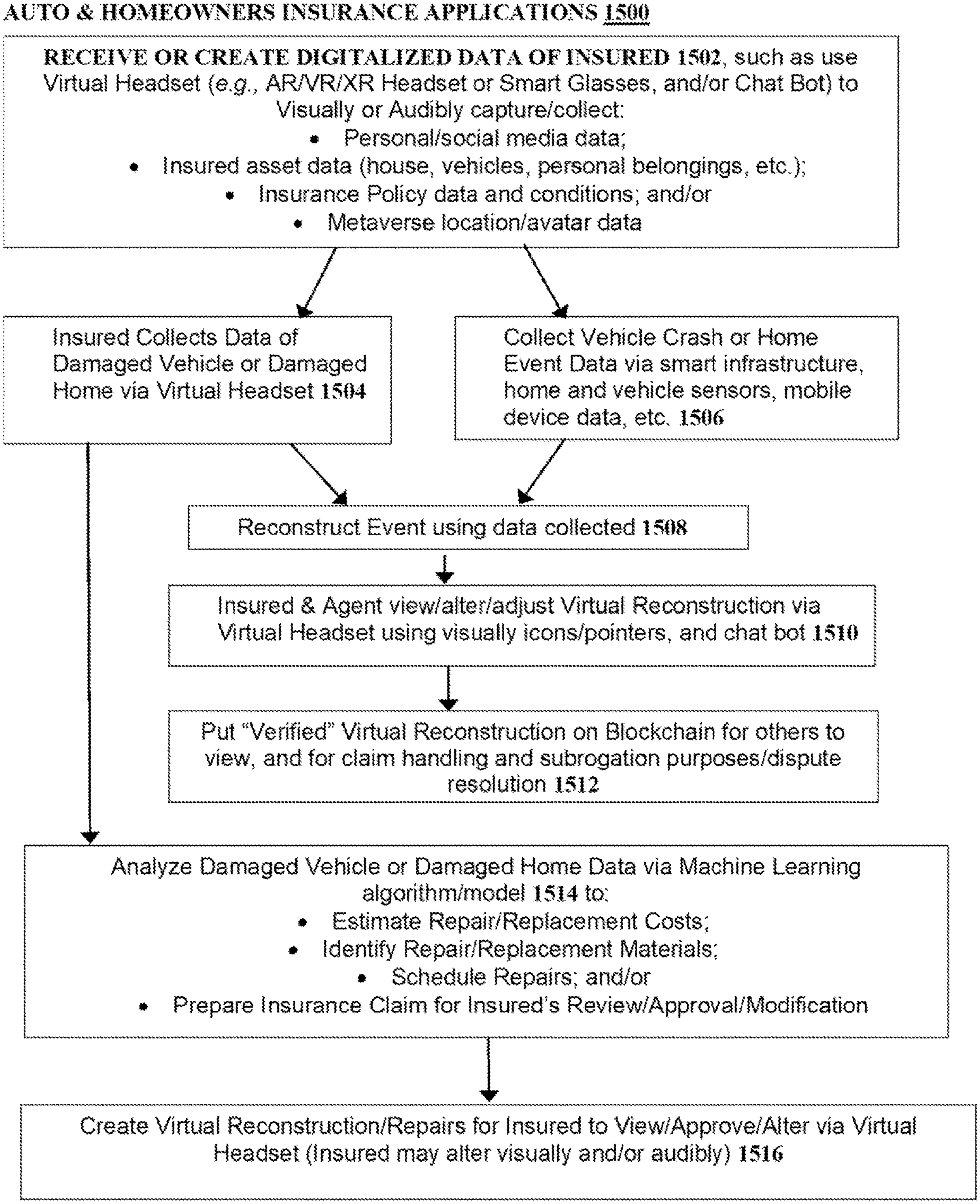
FIG. 15 illustrates an exemplary computer-implemented method of auto insurance and homeowners insurance virtual user experience applications.

FIG. 15 illustrates a computer-implemented method of auto insurance and homeowners insurance virtual applications 1500. The computer-implemented method 1500 may be implemented via one or more local or remote processors, sensors, cameras, transceivers, servers, memory units, chat or voice bots, and/or virtual headsets. The virtual headsets may include AR (Augmented Reality) glasses or headsets, VR (Virtual Reality) glasses or headsets, XR (eXtended Reality) glasses or headsets, or other smart glasses. The headsets or glasses may include audible functionality, such as chat or voice bot functionality, or be configured to work with an associated chat or voice hot, such as a chat or voice bot working with a smart home controller and located within the home.

The computer-implemented method 1500 may include, via one or more local or remote processors, sensors, cameras, transceivers, servers, memory units, chat bots, and/or virtual headsets: (1) receiving or creating digitalized data of an insured 1502, such as via a virtual headset and/or chat bot; (2) collecting damaged vehicle data or damaged home data via a virtual headset and/or chat bot 1504; (3) collecting vehicle collision data or home event data via other data sources 1506, including vehicle telematics data; (4) creating a virtual reconstruction of the vehicle collision or home event 1508; (5) allowing the insured and/or agent to view the virtual reconstruction via a virtual headset, and modify and/or approve the virtual reconstruction via the virtual headset and/or a chat bot 1510; and/or (6) storing the approved virtual reconstruction on a blockchain for insurance claim handling and/or dispute resolution 1512. Additionally or alternatively, the method 1500 may also include, via one or more local or remote processors, sensors, cameras, transceivers, servers, memory units, chat bots, and/or virtual headsets: (7) analyzing the damaged vehicle data or damaged home data via a ML algorithm, model, or program 1514 to (i) estimate repair or replacement costs; (ii) identify repair or replacement materials (and respective suppliers of the materials); (iii) identify qualified and trusted contractors or body shops, and schedule repairs; and/or (iv) prepare an insurance claim for the insured's review, modification, and/or approval; and/or (7) creating a virtual depiction of the repair work and/or predicted final repaired vehicle or home for the insured to review, adjust, and/or approve 1516. The computer-implemented method may include additional, less, or alternate actions, including those discussed elsewhere herein.

The computer-implemented method 1500 may include, via one or more local or remote processors, sensors, cameras, transceivers, servers, memory units, chat bots, and/or virtual headsets, receiving or creating digitalized data of, or associated with, the insured 1502. For instance, the insured may use a virtual headset (such as smart or virtual glasses or headset; or an AR, VR, or XR headset) and/or chatbot to virtually or audibly capture, collect, and/or digitalize (i) personal data and virtual user experience preference data; (ii) social media data; (iii) insured asset data (e.g., house(s), vehicle(s), and personal belonging data); (iv) financial account data; (v) life insurance data, auto insurance data, homeowners insurance data, personal articles insurance data, etc.; (vi) will and/or trust data; and/or (vii) metaverse location and/or avatar data (such as a virtual location owned or associated with the insured, and a virtual avatar or other virtual character of, or associated with the insured).

After an insurance-related event occurs, such as an event that leads to vehicle or home damage, the computer-implemented method 1500 may include, via one or more local or remote processors, sensors, cameras, transceivers, servers, memory units, chat bots, and/or virtual headsets, receiving or creating digitalized data of the vehicle damage or home damage 1504. For instance, an insured may collect data (such as images or audible notes) of, or associated with, a damaged vehicle or damaged home via a virtual headset and/or chat bot.

The computer-implemented method 1500 may include, via one or more local or remote home-mounted sensors, vehicle-mounted sensors, mobile devices, drones, and/or smart infrastructure, collecting or generating data of, or associated with, the damaged vehicle or damaged home, respectively 1506. For instance, vehicle sensors and smart infrastructure data may be associated with, or show, a damaged vehicle or vehicle collision. Smart home sensor, vehicle sensors, or drones may collect data associated with a damaged home. Vehicle telematics data (e.g., acceleration, braking, cornering data) and home telematics data (e.g., electricity usage, water usage, home occupancy data) may also be collected.

The computer-implemented method 1500 may include, via one or more local or remote processors, sensors, cameras, transceivers, servers, memory units, chat bots, and/or virtual headsets, reconstructing the insurance-related event leading to the vehicle or home data using all, or a portion, of the data collected 1508. For instance, a virtual reconstruction of the insurance-related event may be generated or created via one or more processors and servers.

The computer-implemented method 1500 may include (via one or more local or remote processors, sensors, cameras, transceivers, servers, memory units, chat bots, and/or virtual headsets), viewing, altering, and/or approving the virtual reconstruction via a virtual headset 1510. For instance, the insured and/or agent may view the virtual reconstruction, and adjust or alter the virtual reconstruction visually using icons or graphic points, and/or audibly. As an example, the insured may visually move a tree, street light or sign, pedestrians, or vehicles that are represented graphically or by icons, or audibly (via the headset or an associated chat bot), such as by "Move the pine tree three feet to West"; "Add another pedestrian on the East side of the road"; or "Move the black SUV into the passing lane"; or the like.

After the virtual reconstruction is created and/or approved by the insured, the computer-implemented method 1500 may include, via one or more local or remote processors, sensors, cameras, transceivers, servers, memory units, chat bots, and/or virtual headsets, placing or otherwise storing the virtual reconstruction on a blockchain for others to view, and for claim handling and dispute resolution 1512. For instance, the virtual reconstruction may be used for subrogation purposes and/or to determine one or more causes for vehicle damage or home damage, respectively.

The computer-implemented method 1500 may include, via one or more local or remote processors, sensors, cameras, transceivers, servers, memory units, chat bots, and/or virtual headsets, analyzing the damaged vehicle or damaged home data via a ML algorithm, model, or program (or using other techniques, such as pattern recognition techniques) 1514 to (i) estimate repair and/or replacement costs; (ii) identify repair and/or replacement materials and suppliers; (iii) schedule repairs with trusted and qualified contractors; and/or (iv) prepare a virtual insurance claim for the insured's review, approval, or modification.

The computer-implemented method 1500 may include, via one or more local or remote processors, sensors, cameras, transceivers, servers, memory units, chat bots, and/or virtual headsets, creating virtual reconstructions or scenarios 1516 depicting or visually displaying, and/or audibly presenting (a) the estimated repair/replacement costs; (b) the repair/replacement materials, suppliers, and/or costs; (c) available contractors, dates for repair work to be performed, contractor rating, and/or virtual calendar of the insured; and/or (d) the virtual insurance claim created. The insured may view, alter, and/or approve the repair materials, replacement materials, contractors, insurance claim, etc. via the visually or audibly using the headset and/or an associated chat bot or chat bot functionality. The virtual reconstructions may be personalized based upon the insured's preferences, such as noted elsewhere herein, to present a personalized virtual user experience to the insured.

Homeowners Insurance Applications

Figure 16:
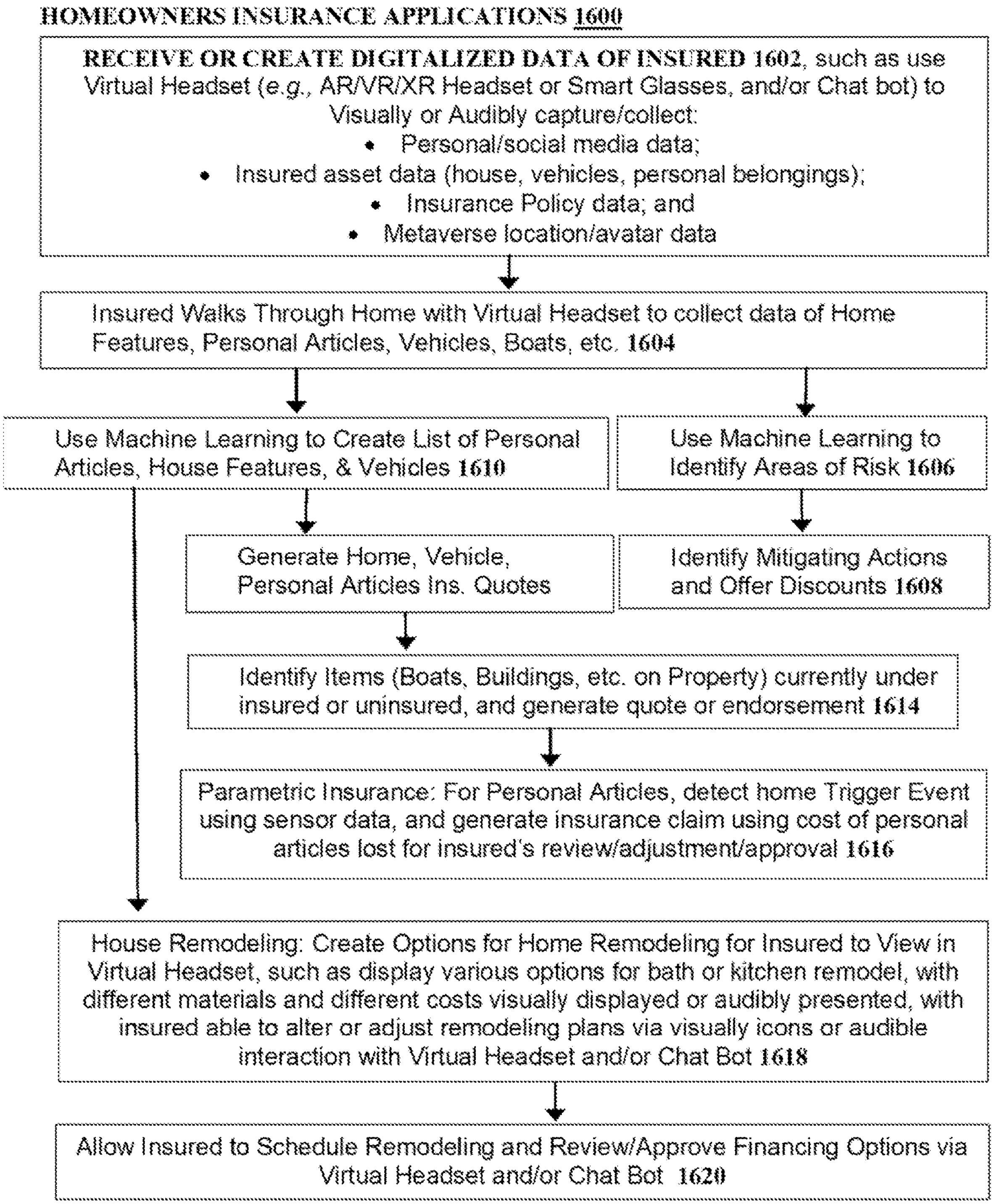
FIG. 16 illustrates another computer-implemented method of auto insurance and homeowners insurance virtual user experience applications.

FIG. 16 illustrates a computer-implemented method of auto insurance and homeowners insurance virtual applications 1600. The computer-implemented method 1600 may be implemented via one or more local or remote processors, sensors, cameras, transceivers, servers, memory units, chat or voice bots, and/or virtual headsets. The virtual headsets may include AR (Augmented Reality) glasses or headsets, VR (Virtual Reality) glasses or headsets, XR (eXtended Reality) glasses or headsets, or other smart glasses. The headsets or glasses may include audible functionality, such as chat or voice bot functionality, or be configured to work with an associated chat or voice bot, such as a chat or voice bot working with a smart home controller and located within the home.

The computer-implemented method 1600 may include, via one or more local or remote processors, sensors, cameras, transceivers, servers, memory units, chat bots, and/or virtual headsets: (1) receiving or creating digitalized data of an insured 1602, such as via a virtual headset and/or chat bot; (2) guiding the insured through a walk-through of their house and belongings wearing the virtual headset to capture data, such as images and audible input, associated with, or of, their belongings (e.g., home, home features and characteristics, vehicles, boats, yard, fixtures, etc.) 1604; (3) utilizing ML to analyze the data captured and identify areas of risk associated with, or located about, the home and yard 1606; (4) identifying risk or potential damage mitigating or corrective actions, and offering homeowners and other insurance discounts if corrective actions are taken 1608; (5) utilizing ML to analyze the data captured and identify areas of interest and items associated with, or located about, the home and yard 1610 (e.g., personal articles, home, home features and characteristics, vehicles, boats, fixtures, etc.); (6) generating a personal articles, homeowners, or auto insurance quote 1612; (7) analyzing the data captured and digitalized data of the insured to identify insurable assets that are uninsured or underinsured (such as insurance for vehicles or boats located on the property, or for structures located on the property, such as a shed or garage), and generating and sending a virtual insurance quote to the insured for viewing on a virtual headset 1614; (8) upon detecting an insurance-related event from analysis of home or other sensor data, generating an insurance claim for the insured related to repair of the home and vehicles, or financial cost or replacement of their personal belongings 1616; (9) creating visual depictions of home remodeling options for viewing on a virtual headset 1618; and/or (10) allowing the insured to view, adjust, or approve one or more of the home remodeling options via the virtual headset and/or chat bot 1620. The computer-implemented method may include additional, less, or alternate actions, including those discussed elsewhere herein.

The computer-implemented method 1600 may include, via one or more local or remote processors, sensors, cameras, transceivers, servers, memory units, chat bots, and/or virtual headsets, receiving or creating digitalized data of, or associated with, the insured 1602. For instance, the insured may use a virtual headset (such as smart or virtual glasses or headset; or an AR, VR, or XR headset) and/or chatbot to virtually or audibly capture, collect, and/or digitalize (i) personal data and virtual user experience preferences; (ii) social media data; (iii) insured asset data (e.g., house(s), vehicle(s), and personal belonging data); (iv) financial account data; (v) life insurance data, auto insurance data, homeowners insurance data, personal articles insurance data, etc.; (vi) will and/or trust data; and/or (vii) metaverse location and/or avatar data (such as a virtual location owned or associated with the insured, and a virtual avatar or other virtual character of, or associated with the insured).

The computer-implemented method 1600 may include, via one or more local or remote processors, sensors, cameras, transceivers, servers, memory units, chat bots, and/or virtual headsets, guiding the insured through a walk-through of their house and belongings wearing the virtual headset to capture data, such as images and audible input, associated with or of their belongings (e.g., home, home features and characteristics, vehicles, boats, yard, fixtures, etc.) 1604. For instance, video or images (and audible notes) collected of the home, yard, and belongings and analyzed to determine whether the items and home features can be identified. If not, visual or audible instructions may be provided via the headset for the user to collect additional video or images of certain items or home areas for further processor analysis.

The computer-implemented method 1600 may include, via one or more local or remote processors, sensors, cameras, transceivers, servers, memory units, chat bots, and/or virtual headsets, utilizing ML to analyze the image and/or audio data captured and identify areas of risk associated with, or located about, the home and yard 1606. For instance, after a home walk-through collects data via a headset, the data may be input into a trained ML program that is trained to identify risks of home damage, such as (i) leaking faucets, pipes, hoses, dishwasher hoses, washing machine hoses; (ii) damaged or decaying roofing materials or shingles, or siding materials; (iii) over grown trees or shrubbery, such as risk of falling trees, or wildfire hazards too close to a home; etc.

The computer-implemented method 1600 may include, via one or more local or remote processors, sensors, cameras, transceivers, servers, memory units, chat bots, and/or virtual headsets, identifying risk or damage mitigating or corrective actions, and offering homeowners and other insurance discounts if corrective actions are taken 1608. For instance, visual representations of corrective actions may be presented (such as fixing leaking hoses or making other home repairs, trimming tree limbs or shrubbery, repairing damaged roofs, installing home lighting for security, etc.). Repair or replacement parts or materials and suppliers may be identified and depicted visually via the virtual headset or audibly via the chat bot.

The computer-implemented method 1600 may include, via one or more local or remote processors, sensors, cameras, transceivers, servers, memory units, chat bots, and/or virtual headsets, utilizing ML to analyze the data captured and identify areas of interest and items associated with, or located about, the home and yard 1610 (e.g., personal articles, home, home features and characteristics, vehicles, boats, fixtures, etc.).

The computer-implemented method 1600 may include, via one or more local or remote processors, sensors, cameras, transceivers, servers, memory units, chat bots, and/or virtual headsets, generating a personal articles, homeowners, or auto insurance quote 1612. The quotes may be based upon home features and characteristics, personal articles, and/or vehicle and vehicle features identified from processor analysis of the data collected via the virtual headset.

The computer-implemented method 1600 may include, via one or more local or remote processors, sensors, cameras, transceivers, servers, memory units, chat bots, and/or virtual headsets, analyzing the data captured and digitalized data of the insured to identify insurable assets that are uninsured or underinsured (such as insurance for vehicles or boats located on the property, or for structures located on the property, such as a shed or garage), and generating and sending a virtual insurance quote to the insured for viewing on a virtual headset 1614. For instance, the virtual headset itself may analyze the items in view in real-time, determine that an item is uninsured (such as a boat parked in the backyard), and generate an insurance quote for review on the visual headset.

The computer-implemented method 1600 may include, via one or more local or remote processors, sensors, cameras, transceivers, servers, memory units, chat bots, and/or virtual headsets, upon detecting an insurance-related event from analysis of home or other sensor data, generating an insurance claim for the insured related to the repair of the home and vehicles, or the financial cost or replacement of their personal belongings 1616. For instance, if there is smoke damage in one or more rooms of the house due to a fire, repair materials and costs may be identified via one or more local or remote processors and then visually and/or audibly presented to the insured via the headset.

The computer-implemented method 1600 may include, via one or more local or remote processors, sensors, cameras, transceivers, servers, memory units, chat bots, and/or virtual headsets, creating visual depictions of home remodeling options for viewing on a virtual headset 1618. For instance, various options for bath or kitchen remodeling may be visually depicted on, and/or audibly presented via, the virtual headset. Different materials and different costs may also be visually displayed or audibly presented to the insured for the review.

The computer-implemented method 1600 may include, via one or more local or remote processors, sensors, cameras, transceivers, servers, memory units, chat bots, and/or virtual headsets, allowing the insured to view, adjust, or approve one or more of the home remodeling options via the virtual headset and/or chat bot 1620. For instance, the insured may alter or adjust the remodeling plans via visual selections (different material selections, different contractor options, different timetable selections for the work being performed) and/or audible interaction(s) with the virtual headset and/or chat bot.

EXEMPLARY EMBODIMENTS

In one aspect, a computer-implemented method of distributing assets in a virtual world via a virtual headset may be provided. The method may include (1) receiving or creating, via an insured virtual headset and/or chat bot associated with an insured, digitalized data of, or associated with, the insured; (2) adjusting and/or approving, via the insured virtual headset and/or chat bot associated with an insured, a listing of assets and a disposition of assets belonging to the insured; (3) receiving or creating, via a beneficiary virtual headset and/or chat bot associated with a beneficiary, digitalized data of, or associated with, the beneficiary; (4) creating, via the beneficiary virtual headset and/or chat bot associated with the beneficiary, a personalized virtual user experience for the beneficiary (that is personalized using one or more visual, graphic, or audible inputs and/or settings selected by beneficiary or predicted for the beneficiary based upon the digitalized data of, or associated with, the beneficiary); (5) capturing or receiving, via the beneficiary virtual headset and/or a chat bot associated with the beneficiary, a digital death certificate of the insured captured by the beneficiary; and/or (6) handling or otherwise processing, via the beneficiary virtual headset and/or a chat bot associated with the beneficiary, the disposition of one or more assets identified in the (i) digital or virtual will, or (ii) digital or virtual life insurance policy in a virtual world via the beneficiary virtual headset and/or chat bot, the virtual world reflecting the personalized virtual user experience for the beneficiary. The method may include additional, less, or alternate actions, including those discussed elsewhere herein.

For instance, creating, via the beneficiary virtual headset and/or chat bot associated with the beneficiary, a personalized virtual user experience for the beneficiary may include (i) determining or receiving preference metaverse location for virtual interactions and experiences of the beneficiary; (ii) receiving one or more visual or audible selections entered by the beneficiary via the virtual headset and/or associated chat bot; and/or (iii) predicting preferred virtual experience settings for the beneficiary based upon the digitalized data of, or associated with, the beneficiary, the digitalized data of the beneficiary including social media posts and the settings including visually or audible settings.

The receiving or creating, via an insured virtual headset and/or chat bot associated with an insured, digitalized data of, or associated with, the insured may include the insured capturing images of an insurance policy or will via the virtual headset to create a digitalized insurance policy or will.

In another aspect, a computer-implemented method of creating a virtual reconstruction of an insurance-related event may be provided. The method may include (1) receiving or creating, via an insured virtual headset and/or chat bot associated with an insured, digitalized data of, or associated with, the insured; (2) receiving or creating, via an insured virtual headset and/or chat bot associated with an insured, digitalized data of, or associated with a damaged vehicle or damaged home; (3) receiving or creating, via one or more additional sources (e.g., vehicle sensors, home sensors, smart infrastructure), digitalized data of, or associated with a damaged vehicle or damaged home; (4) virtually reconstructing, via one or more processors and/or the virtual headset, the insurance-related event that caused the vehicle damage or home damage, respectively; and/or (5) displaying or presenting the virtual reconstruction via the virtual headset to facilitate the insured or agent to view, alter, or approve the virtual reconstruction. The method may include additional, less, or alternate actions, including those discussed elsewhere herein.

For instance, the method may include inputting the damaged vehicle or damage home data into a ML program that is trained to (i) estimate repair or replacement costs; (ii) identify repair or replacement materials; (iii) schedule repairs with body shops or home contractors; and/or (iv) prepare a pre-populated virtual insurance claim for the insured's review, modification, or approval. The method may also include (a) using the output of the ML program to generate virtual or visual depictions of (i) the estimated repair or replacement costs; (ii) the identified repair or replacement materials; (iii) the scheduled repairs with body shops or home contractors; and/or (iv) the prepare a pre-populated virtual insurance claim for the insured's review, modification, or approval; and/or (b) depict or display the virtual or visual depictions on the virtual headset for the insured's review, modification, or approval.

In another aspect, a computer-implemented method of creating a virtual reconstruction of a home may be provided. The method may include (1) receiving or creating, via an insured virtual headset and/or chat bot associated with an insured, digitalized data of, or associated with, the insured; (2) receiving or creating, via an insured virtual headset and/or chat bot associated with an insured, digitalized data of, or associated with a home, the insured being guided during a home walk-through to capture digitalized home data; (3) receiving or creating, via one or more additional sources (e.g., vehicle sensors, home sensors, smart infrastructure), digitalized data of, or associated with the home; and/or (4) inputting the digitalized home data received or created, via one or more processors, into a trained ML program that is trained to identify home features and characteristics, personal belongings, and/or risks of home damage from analysis of the digitalized home data. The method may include additional, less, or alternate actions, including those discussed elsewhere herein.

For instance, the method may include creating, via one or more processors, a virtual reconstruction of a home displaying the risks of home damage identified by the ML program; and/or displaying or presenting, via one or more processors and/or the insured virtual headset, the virtual reconstruction including the risks of home damage on the insured virtual headset for the insured to view. The method may also include (i) identifying mitigating or corrective actions, via one or more processors and/or ML programs, to reduce the risk of home damage; (ii) creating, via one or more processors and/or the insured virtual headset, a virtual reconstruction of the home displaying the corrective actions; and/or (iii) displaying or presenting, via one or more processors and/or the insured virtual headset, the virtual reconstruction including the corrective actions on the insured virtual headset for the insured to view.

The method may also include (i) creating, via one or more processors and/or the insured virtual headset, one or more home remodeling options based upon the home data collected, the remodeling options including descriptions of materials, costs, suppliers, and/or contractors; and/or (ii) displaying, via one or more processors and/or the insured virtual headset, a virtual depiction of the one or more remodeling options for the insured's review, modification, and/or approval. The method may also include accepting, via one or more processors and/or the insured virtual headset, user selection of (a) materials to be used; (b) contractors to be used, and/or (c) times or days the work is to be performed for the one or more remodeling options.

EXEMPLARY ASPECTS

The following, non-exclusive list includes various aspects explicitly contemplated by the present disclosure:

Aspect 1. A computer-implemented method of distributing assets in a virtual world via a virtual headset, the method comprising: receiving or creating, via an insured virtual headset and/or chat bot associated with an insured, digitalized data of, or associated with, the insured; adjusting and/or approving, via an insured virtual headset and/or chat bot associated with an insured, a listing of assets and a disposition of assets belonging to the insured; receiving or creating, via a beneficiary virtual headset and/or chat bot associated with a beneficiary, digitalized data of, or associated with, the beneficiary; creating, via the beneficiary virtual headset and/or chat bot associated with the beneficiary, a personalized virtual user experience for the beneficiary (that is personalized using one or more visual, graphic, or audible inputs and/or settings selected by beneficiary or predicted for the beneficiary based upon the digitalized data of, or associated with, the beneficiary); capturing or receiving, via the beneficiary virtual headset and/or a chat bot associated with the beneficiary, a digital death certificate of the insured captured by the beneficiary; and/or handling or otherwise processing, via the beneficiary virtual headset and/or a chat bot associated with the beneficiary, the disposition of one or more assets identified in the (i) digital or virtual will, or (ii) digital or virtual life insurance policy in a virtual world via the beneficiary virtual headset and/or chat bot, the virtual world reflecting the personalized virtual user experience for the beneficiary.

Aspect 2. The computer-implemented method of aspect 1, wherein creating, via the beneficiary virtual headset and/or chat bot associated with the beneficiary, a personalized virtual user experience for the beneficiary includes determining or receiving preference metaverse location for virtual interactions and experiences of the beneficiary.

Aspect 3. The computer-implemented method of aspect 1, wherein creating, via the beneficiary virtual headset and/or chat bot associated with the beneficiary, a personalized virtual user experience for the beneficiary includes receiving one or more visual or audible selections entered by the beneficiary via the virtual headset and/or associated chat bot.

Aspect 4. The computer-implemented method of aspect 1, wherein creating, via the beneficiary virtual headset and/or chat bot associated with the beneficiary, a personalized virtual user experience for the beneficiary includes predicting preferred virtual experience settings for the beneficiary based upon the digitalized data of, or associated with, the beneficiary, the digitalized data of the beneficiary including social media posts and the settings including visually or audible settings.

Aspect 5. The computer-implemented method of aspect 1, wherein receiving or creating, via an insured virtual headset and/or chat bot associated with an insured, digitalized data of, or associated with, the insured includes the insured capturing images of an insurance policy or will via the virtual headset to create a digitalized insurance policy or will.

Aspect 6. A computer-implemented method of creating a virtual reconstruction of an insurance-related event, the method comprising: receiving or creating, via an insured virtual headset and/or chat bot associated with an insured, digitalized data of, or associated with, the insured; receiving or creating, via an insured virtual headset and/or chat bot associated with an insured, digitalized data of, or associated with a damaged vehicle or damaged home; receiving or creating, via one or more additional sources (e.g., vehicle sensors, home sensors, smart infrastructure), digitalized data of, or associated with a damaged vehicle or damaged home; virtually reconstructing, via one or more processors and/or the virtual headset, the insurance-related event that caused the vehicle damage or home damage, respectively; and/or placing or presenting, via the virtual reconstruction via the virtual headset to facilitate the insured or agent to view, alter, or approve the virtual reconstruction.

Aspect 7. The computer-implemented method of aspect 6, the method comprising: inputting the damaged vehicle or damage home data into a machine learning program that is trained to (i) estimate repair or replacement costs; (ii) identify repair or replacement materials; (iii) schedule repairs with body shops or home contractors; and/or (iv) prepare a pre-populated virtual insurance aspect for the insured's review, modification, or approval.

Aspect 8. The computer-implemented method of aspect 7, the method comprising: using the output of the machine learning program to general virtual or visual depictions of (i) the estimated repair or replacement costs; (ii) the identified repair or replacement materials; (iii) the scheduled repairs with body shops or home contractors; and/or (iv) the prepared pre-populated virtual insurance aspect for the insured's review, modification, or approval; and depicting or displaying the virtual or visual depictions on the virtual headset for the insured's review, modification, or approval.

Aspect 9. A computer-implemented method of creating a virtual reconstruction of a home, the method comprising: receiving or creating, via an insured virtual headset and/or chat bot associated with an insured, digitalized data of, or associated with, the insured; receiving or creating, via an insured virtual headset and/or chat bot associated with an insured, digitalized data of, or associated with a home, the insured being guided during a home walk-through to capture digitalized home data; receiving or creating, via one or more additional sources (e.g., vehicle sensors, home sensors, smart infrastructure), digitalized data of, or associated with the home; and/or inputting the digitalized home data received or created, via one or more processors, into a trained machine learning program that is trained to identify home features and characteristics, personal belongings, and/or risks of home damage from analysis of the digitalized home data.

Aspect 10. The computer-implemented method of aspect 9, the method further comprising: creating, via one or more processors, a virtual reconstruction of a home displaying the risks of home damage identified by the machine learning program; and displaying or presenting, via one or more processors and/or the insured virtual headset, the virtual reconstruction including the risks of home damage on the insured virtual headset for the insured to view.

Aspect 11. The computer-implemented method of aspect 10, the method further comprising: identifying mitigating or corrective actions, via one or more processors and/or machine learning programs, to reduce the risk of home damage; creating, via one or more processors and/or the insured virtual headset, a virtual reconstruction of the home displaying the corrective actions; and displaying or presenting, via one or more processors and/or the insured virtual headset, the virtual reconstruction including the corrective actions on the insured virtual headset for the insured to view.

Aspect 12. The computer-implemented method of aspect 9, the method further comprising: creating, via one or more processors and/or the insured virtual headset, one or more home remodeling options based upon the home data collected, the remodeling options including descriptions of materials, costs, suppliers, and/or contractors; and displaying, via one or more processors and/or the insured virtual headset, a virtual depiction of the one or more remodeling options for the insured's review, modification, and/or approval.

Aspect 13. The computer-implemented method of aspect 12, the method further comprising: accepting, via one or more processors and/or the insured virtual headset, user selection of materials to be used, contractors to be used, and times or days the work is to be performed for the one or more remodeling options.

Aspect 14. A computer-implemented method, the method comprising: presenting a first extended reality. (XR) environment using a first XR device associated with a person; providing, in the first XR environment, one or more user interfaces to the person; and receiving, from the person via the one or more user interfaces in the first XR environment, one or more preferences of the person.

Aspect 15. The computer-implemented method of aspect 14, wherein at least one of the one or more preferences includes one or more XR preferences, and the method further comprises: generating a second XR environment in accordance with at least one of the one or more XR preferences; and presenting the second XR environment using a second XR device Aspect 16. The computer-implemented method of aspect 15, wherein the one or more XR preferences include a preferred avatar and a preferred scene, and wherein generating the second XR environment includes generating the second XR environment to represent the preferred scene and to depict the person with the preferred avatar.

Aspect 17. The computer-implemented method of aspect 15, wherein the one or more XR preferences include one or more metaverse preferences including one or more of a preferred metaverse scene, a preferred metaverse location, a metaverse identifier, or a preferred avatar, and wherein generating the second XR environment includes generating the second XR environment to represent a metaverse environment in accordance with the one or more metaverse preferences.

Aspect 18. The computer-implemented method of aspect 14, wherein at least one of the one or more preferences represents one or more of a virtual interaction preference, a preferred XR device, a preferred XR device type, an XR device identifier, or a willingness to hold virtual meetings.

Aspect 19. The computer-implemented method of aspect 14, wherein at least one of the one or more preferences represents one or more of personal data, social media data, an insurance policy number, an insured asset, financial account information, a will, a trust, a preferred asset disposition option, or a preferred asset disposition method.

Aspect 20. The computer-implemented method of aspect 14, wherein the second XR device is the first XR device.

Aspect 21. The computer-implemented method of aspect 14, wherein the first XR environment includes a virtual meeting of avatars of the person and a third person via respective XR devices.

Aspect 22. The computer-implemented method of aspect 14, wherein the first XR device includes at least one of (i) an augmented reality (AR), mixed reality (MR), or virtual reality (VR) headset, (ii) AR, MR, or VR smart glasses, (iii) an audio input device configured to enable the person to interact with a voice bot, or (iv) a text input device configured to enable the person to interact with a chatbot.

Aspect 23. A system, comprising: a communication interface; and one or more processors configured to: present a first extended reality (XR) environment using a first XR device associated with a person; provide, in the first XR environment via the communication interface, one or more user interfaces to the person; and receive, from the person via the one or more user interfaces in the first XR environment via the communication interface, one or more preferences of the person.

Aspect 24. The system of aspect 23, wherein at least one of the one or more preferences includes one or more XR preferences, and the one or more processors are configured to: generate a second XR environment in accordance with at least one of the one or more XR preferences; and present the second XR environment using a second XR device Aspect 25. The system of aspect 24, wherein the one or more XR preferences include a preferred avatar and a preferred scene, and wherein generating the second XR environment includes generating the second XR environment to represent the preferred scene and to depict the person with the preferred avatar.

Aspect 26. The system of aspect 24, wherein the one or more XR preferences include one or more metaverse preferences including one or more of a preferred metaverse scene, a preferred metaverse location, a metaverse identifier, or a preferred avatar, and wherein generating the second XR environment includes generating the second XR environment to represent a metaverse environment in accordance with the one or more metaverse preferences.

Aspect 27. The system of aspect 23, wherein at least one of the one or more preferences represents one or more of a virtual interaction preference, a preferred XR device, a preferred XR device type, an XR device identifier, or a willingness to hold virtual meetings.

Aspect 28. The system of aspect 23, wherein at least one of the one or more preferences represents one or more of personal data, social media data, an insurance policy number, an insured asset, financial account information, a will, a trust, a preferred asset disposition option, or a preferred asset disposition method.

Aspect 29. The system of aspect 23, wherein the second XR device is the first XR device.

Aspect 30. The system of aspect 23, wherein the first XR environment includes a virtual meeting of avatars of the person and a third person via respective XR devices.

Aspect 31. The system of aspect 23, wherein the first XR device includes at least one of (i) an augmented reality (AR), mixed reality (MR), or virtual reality (VR) headset, (ii) AR, MR, or VR smart glasses, (iii) an audio input device configured to enable the person to interact with a voice bot, or (iv) a text input device configured to enable the person to interact with a chatbot.

Aspect 32. A non-transitory computer-readable storage medium storing instructions that, when executed by one or more processors, cause a system to: present a first extended reality (XR) environment using a first XR device associated with a person; provide, in the first XR environment, one or more user interfaces to the person; and receive, from the person via the one or more user interfaces in the first XR environment, one or more preferences of the person.

Aspect 33. The storage medium of aspect 32, wherein at least one of the one or more preferences includes one or more XR preferences, and the instructions, when executed by the one or more processors, cause the system to: generate a second XR environment in accordance with at least one of the one or more XR preferences; and present the second XR environment using a second XR device.

Aspect 34. The storage medium of aspect 33, wherein the one or more XR preferences include a preferred avatar and a preferred scene, and wherein generating the second XR environment includes generating the second XR environment to represent the preferred scene and to depict the person with the preferred avatar.

Aspect 35. The storage medium of aspect 33, wherein the one or more XR preferences include one or more metaverse preferences including one or more of a preferred metaverse scene, a preferred metaverse location, a metaverse identifier, or a preferred avatar, and wherein generating the second XR environment includes generating the second XR environment to represent a metaverse environment in accordance with the one or more metaverse preferences.

Aspect 36. The storage medium of aspect 32, wherein at least one of the one or more preferences represents one or more of a virtual interaction preference, a preferred XR device, a preferred XR device type, an XR device identifier, or a willingness to hold virtual meetings.

Aspect 37. The storage medium of aspect 32, wherein at least one of the one or more preferences represents one or more of personal data, social media data, an insurance policy number, an insured asset, financial account information, a will, a trust, a preferred asset disposition option, or a preferred asset disposition method.

Aspect 38. The storage medium of aspect 32, wherein the second XR device is the first XR device.

Aspect 39. The storage medium of aspect 32, wherein the first XR environment includes a virtual meeting of avatars of the person and a third person via respective XR devices.

Aspect 40. The storage medium of aspect 32, wherein the first XR device includes at least one of (i) an augmented reality (AR), mixed reality (MR), or virtual reality (VR) headset, (ii) AR, MR, or VR smart glasses, (iii) an audio input device configured to enable the person to interact with a voice bot, or (iv) a text input device configured to enable the person to interact with a chatbot.

Aspect 41. A computer-implemented method, the method comprising: obtaining one or more extended reality (XR) preferences for a person; generating, using one or more processors, an XR environment in accordance with at least one of the one or more XR preferences; providing, in the XR environment using an XR device associated with the person, one or more user interfaces; receiving, from the person via the one or more user interfaces in the XR environment, asset data; generating, using one or more processors, estate data for the person that includes the asset data; and presenting, in the XR environment using the XR device, one or more visual depictions of the estate data such that the person can at least one of view, modify, or approve the estate data.

Aspect 42. The computer-implemented method of aspect 41, wherein the one or more user interfaces includes a first input element usable by the person to provide a document, and the method further comprises: processing, using one or more processors, the document to obtain the asset data.

Aspect 43. The computer-implemented method of aspect 42, wherein processing the document includes processing, using one or more processors, the document with one or more of optical character recognition, text recognition, or natural language processing.

Aspect 44. The computer-implemented method of aspect 41, wherein the estate data includes a plurality of asset records for respective ones of a plurality of assets associated with the person, wherein one or more of the assets are dispensable upon death of the person.

Aspect 45. The computer-implemented method of aspect 44, wherein an asset data record for an asset includes data representing one or more of (i) the person, (ii) a third-person associated with the asset, (iii) account information for the asset, (iv) policy information for the asset, (iv) one or more contractual terms for the asset, (v) a value of the asset, (vi) one or more beneficiaries, (vii) one or more legal executors, (viii) a description of the asset, (ix) an asset type, (x) one or more disposition options, or (xi) one or more dispositions of the asset.

Aspect 46. The computer-implemented method of aspect 44, wherein an asset includes one of (i) an insurance policy, (ii) a bank account, (iii) an investment account, (iv) a savings account, (v) a checking account, (vi) a belonging, (vii) a business or stake in a business, (viii) an investment, (ix) a retirement savings account, (x) an annuity, or (xi) a property.

Aspect 47. The computer-implemented method of aspect 41, further comprising: causing the estate data to be stored on a distributed ledger.

Aspect 48. The computer-implemented method of aspect 41, wherein obtaining the one or more XR preferences includes obtaining the one or more XR preferences from the person using one or more XR devices.

Aspect 49. The computer-implemented method of aspect 41, wherein the XR preferences represent one or more of profile data for the person, virtual interaction preferences, metaverse preferences, or avatar preferences.

Aspect 50. The computer-implemented method of aspect 41, further comprising: providing, in another XR environment using another XR device associated with another person, one or more visual depictions of the estate data such that the other person can at least one of view, modify, or approve the estate data.

Aspect 51. The computer-implemented method of aspect 41, wherein presenting the one or more visual depictions of the estate data in the XR environment includes providing a virtual meeting of avatars of the person and another person via respective XR devices.

Aspect 52. The computer-implemented method of aspect 41, wherein the XR device includes at least one of (i) an augmented reality (AR), mixed reality (MR), or virtual reality (VR) headset, or (ii) AR, MR, or VR smart glasses.

Aspect 53. A system, comprising: a communication interface; and one or more processors configured to: obtain one or more extended reality (XR) preferences for a person; generate, using one or more processors, an XR environment in accordance with at least one of the one or more XR preferences; provide, in the XR environment using an XR device associated with the person via the communication interface, one or more user interfaces; receive, from the person via the one or more user interfaces in the XR environment and communication interface, asset data; generate, using one or more processors, estate data for the person that includes the asset data; and present, in the XR environment using the XR device via the communication interface, one or more visual depictions of the estate data such that the person can at least one of view, modify, or approve the estate data.

Aspect 54. The system of aspect 53, wherein the one or more user interfaces includes a first input element usable by the person to provide a document, and the one or more processors are configured to: process, using one or more processors, the document to obtain the asset data.

Aspect 55. The system of aspect 54, wherein processing the document includes processing, using one or more processors, the document with one or more of optical character recognition, text recognition, or natural language processing.

Aspect 56. The system of aspect 53, wherein the estate data includes a plurality of asset records for respective ones of a plurality of assets associated with the person, wherein one or more of the assets are dispensable upon death of the person.

Aspect 57. The system of aspect 56, wherein an asset data record for an asset includes data representing one or more of (i) the person, (ii) a third-person associated with the asset, (iii) account information for the asset, (iv) policy information for the asset, (iv) one or more contractual terms for the asset, (v) a value of the asset, (vi) one or more beneficiaries, (vii) one or more legal executors, (viii) a description of the asset, (ix) an asset type, (x) one or more disposition options, or (xi) one or more dispositions of the asset.

Aspect 58. The system of aspect 56, wherein an asset includes one of (i) an insurance policy, (ii) a bank account, (iii) an investment account, (iv) a savings account, (v) a checking account, (vi) a belonging, (vii) a business or stake in a business, (viii) an investment, (ix) a retirement savings account, (x) an annuity, or (xi) a property.

Aspect 59. The system of aspect 53, wherein the one or more processors are configured to: causing the estate data to be stored on a distributed ledger.

Aspect 60. The system of aspect 53, wherein obtaining the one or more XR preferences includes obtaining the one or more XR preferences from the person using one or more XR devices.

Aspect 61. The system of aspect 53, wherein the XR preferences represent one or more of profile data for the person, virtual interaction preferences, metaverse preferences, or avatar preferences.

Aspect 62. The system of aspect 53, wherein the one or more processors are configured to: provide, in another XR environment using another XR device associated with another person, one or more visual depictions of the estate data such that the other person can at least one of view, modify, or approve the estate data.

Aspect 63. The system of aspect 53, wherein presenting the one or more visual depictions of the estate data in the XR environment includes providing a virtual meeting of avatars of the person and another person via respective XR devices.

Aspect 64. The system of aspect 53, wherein the XR device includes at least one of (i) an augmented reality (AR), mixed reality (MR), or virtual reality (VR) headset, or (ii) AR, MR, or VR smart glasses.

Aspect 65. A non-transitory computer-readable storage medium storing instructions that, when executed by one or more processors, cause a system to: obtain one or more extended reality (XR) preferences for a person; generate, using one or more processors, an XR environment in accordance with at least one of the one or more XR preferences; provide, in the XR environment using an XR device associated with the person, one or more user interfaces; receive, from the person via the one or more user interfaces in the XR environment, asset data; generate, using one or more processors, estate data for the person that includes the asset data; and present, in the XR environment using the XR device, one or more visual depictions of the estate data such that the person can at least one of view, modify, or approve the estate data.

Aspect 66. The storage medium of aspect 65, wherein the one or more user interfaces includes a first input element usable by the person to provide a document, and the instructions, when executed by one or more processors, causes the system to: process, using one or more processors, the document to obtain the asset data.

Aspect 67. The storage medium of aspect 66, wherein processing the document includes processing, using one or more processors, the document with one or more of optical character recognition, text recognition, or natural language processing.

Aspect 68. The storage medium of aspect 65, wherein the estate data includes a plurality of asset records for respective ones of a plurality of assets associated with the person, wherein one or more of the assets are dispensable upon death of the person.

Aspect 69. The storage medium of aspect 68, wherein an asset data record for an asset includes data representing one or more of (i) the person, (ii) a third-person associated with the asset, (iii) account information for the asset, (iv) policy information for the asset, (iv) one or more contractual terms for the asset, (v) a value of the asset, (vi) one or more beneficiaries, (vii) one or more legal executors, (viii) a description of the asset, (ix) an asset type, (x) one or more disposition options, or (xi) one or more dispositions of the asset.

Aspect 70. The storage medium of aspect 69, wherein an asset includes one of (i) an insurance policy, (ii) a bank account, (iii) an investment account, (iv) a savings account, (v) a checking account, (vi) a belonging, (vii) a business or stake in a business, (viii) an investment, (ix) a retirement savings account, (x) an annuity, or (xi) a property.

Aspect 71. The storage medium of aspect 65, wherein the one or more processors are configured to: cause the estate data to be stored on a distributed ledger.

Aspect 72. The storage medium of aspect 65, wherein obtaining the one or more XR preferences includes obtaining the one or more XR preferences from the person using one or more XR devices.

Aspect 73. The storage medium of aspect 65, wherein the XR preferences represent one or more of profile data for the person, virtual interaction preferences, metaverse preferences, or avatar preferences.

Aspect 74. The storage medium of aspect 65, wherein the instructions, when executed by one or more processors, causes the system to: provide, in another XR environment using another XR device associated with another person, one or more visual depictions of the estate data such that the other person can at least one of view, modify, or approve the estate data.

Aspect 75. The storage medium of aspect 65, wherein presenting the one or more visual depictions of the estate data in the XR environment includes providing a virtual meeting of avatars of the person and another person via respective XR devices.

Aspect 76. The storage medium of aspect 65, wherein the XR device includes at least one of (i) an augmented reality (AR), mixed reality (MR), or virtual reality (VR) headset, or (ii) AR, MR, or VR smart glasses.

Aspect 77. A computer-implemented method, the method comprising: obtaining one or more extended reality (XR) preferences for a person; generating, using one or more processors, an XR environment in accordance with the one or more XR preferences; identifying, using one or more processors, one or more estate assets associated with a deceased person for which the person is a legal executor or beneficiary; determining, using or more processors, one or more possible dispositions for the one or more assets; and providing, in the XR environment using an XR device associated with the person, one or more user interfaces that include displaying the one or more possible disposition options such that the person can view, modify, select, or approve disposition options.

Aspect 78. The computer-implemented method of aspect 77, further comprising: causing selected disposition options to be executed.

Aspect 79. The computer-implemented method of aspect 77, further comprising: obtaining, from the person via a second XR environment, a death certificate for the deceased person to which the one or more assets belonged; and validating that the one or more assets can be disposed based upon the death certificate.

Aspect 80. The computer-implemented method of aspect 77, wherein the estate data includes a plurality of asset records for respective ones of a plurality of assets associated with the second person, wherein one or more of the assets are dispensable upon death of the second person.

Aspect 81. The computer-implemented method of aspect 80, wherein an asset data record for an asset includes data representing one or more of (i) the second person, (ii) a third-person associated with the asset, (iii) account information for the asset, (iv) policy information for the asset, (iv) one or more contractual terms for the asset, (v) a value of the asset, (vi) one or more beneficiaries, (vii) one or more legal executors, (viii) a description of the asset, (ix) an asset type, (x) one or more disposition options, or (xi) one or more dispositions of the asset.

Aspect 82. The computer-implemented method of aspect 80, wherein an asset includes one of (i) an insurance policy, (ii) a bank account, (iii) an investment account, (iv) a savings account, (v) a checking account, (vi) a belonging, (vii) a business or stake in a business, (viii) an investment, (ix) a retirement savings account, (x) an annuity, or (xi) a property.

Aspect 83. The computer-implemented method of aspect 77, further comprising: updating the estate data to include disposition records for selected disposition options; and causing the updated estate data to be stored on a distributed ledger.

Aspect 84. The computer-implemented method of aspect 77, wherein obtaining the one or more XR preferences includes obtaining the one or more XR preferences from the person using one or more XR devices.

Aspect 85. The computer-implemented method of aspect 77, wherein the one or more XR preferences represent one or more of profile data for the first person, virtual interaction preferences, metaverse preferences, or avatar preferences.

Aspect 86. The computer-implemented method of aspect 77, further comprising: providing, in another XR environment using another XR device associated with another person, one or more visual depictions of the estate data such that the other person can approve selected dispositions.

Aspect 87. The computer-implemented method of aspect 77, wherein providing the one or more visual depictions of the one or more possible disposition options in the XR environment includes providing a virtual meeting of avatars of the person and another person via respective XR devices.

Aspect 88. The computer-implemented method of aspect 77, wherein the XR device includes at least one of (i) an augmented reality (AR), mixed reality (MR), or virtual reality (VR) headset, or (ii) AR, MR, or VR smart glasses.

Aspect 89. A system, comprising: a communication interface; and one or more processors configured to: obtain one or more extended reality (XR) preferences for a person; generate, using one or more processors, an XR environment in accordance with the one or more XR preferences; identify, using one or more processors, one or more estate assets associated with a deceased person for which the person is a legal executor or beneficiary; determine, using or more processors, one or more possible dispositions for the one or more assets; and provide, in the XR environment using an XR device associated with the person via the communication interface, one or more user interfaces that include displaying the one or more possible disposition options such that the person can view, modify, select, or approve disposition options.

Aspect 90. The system of aspect 89, wherein the one or more processors are configured to: cause selected disposition options to be executed.

Aspect 91. The system of aspect 89, the one or more processors are configured to: obtain, from the person via a second XR environment, a death certificate for the deceased person to which the one or more assets belonged; and validate that the one or more assets can be disposed based upon the death certificate.

Aspect 92. The system of aspect 89, wherein the estate data includes a plurality of asset records for respective ones of a plurality of assets associated with the second person, wherein one or more of the assets are dispensable upon death of the second person.

Aspect 93. The system of aspect 92, wherein an asset data record for an asset includes data representing one or more of (i) the second person, (ii) a third-person associated with the asset, (iii) account information for the asset, (iv) policy information for the asset, (iv) one or more contractual terms for the asset, (v) a value of the asset, (vi) one or more beneficiaries, (vii) one or more legal executors, (viii) a description of the asset, (ix) an asset type, (x) one or more disposition options, or (xi) one or more dispositions of the asset.

Aspect 94. The system of aspect 92, wherein an asset includes one of (i) an insurance policy, (ii) a bank account, (iii) an investment account, (iv) a savings account, (v) a checking account, (vi) a belonging, (vii) a business or stake in a business, (viii) an investment, (ix) a retirement savings account, (x) an annuity, or (xi) a property.

Aspect 95. The system of aspect 89, the one or more processors are configured to: update the estate data to include disposition records for selected disposition options; and cause the updated estate data to be stored on a distributed ledger.

Aspect 96. The system of aspect 89, wherein obtaining the one or more XR preferences includes obtaining the one or more XR preferences from the person using one or more XR devices.

Aspect 97. The system of aspect 89, wherein the one or more XR preferences represent one or more of profile data for the first person, virtual interaction preferences, metaverse preferences, or avatar preferences.

Aspect 98. The system of aspect 89, the one or more processors are configured to: provide, in another XR environment using another XR device associated with another person, one or more visual depictions of the estate data such that the other person can approve selected dispositions.

Aspect 99. The system of aspect 89, wherein providing the one or more visual depictions of the one or more possible disposition options in the XR environment includes providing a virtual meeting of avatars of the person and another person via respective XR devices.

Aspect 100. The system of aspect 89, wherein the XR device includes at least one of (i) an augmented reality (AR), mixed reality (MR), or virtual reality (VR) headset, or (ii) AR, MR, or VR smart glasses.

Aspect 101. A non-transitory computer-readable storage medium storing instructions that, when executed by one or more processors, cause a system to: obtain one or more extended reality (XR) preferences for a person; generate, using one or more processors, an XR environment in accordance with the one or more XR preferences; identify, using one or more processors, one or more estate assets associated with a deceased person for which the person is a legal executor or beneficiary; determine, using or more processors, one or more possible dispositions for the one or more assets; and provide, in the XR environment using an XR device associated with the person via the communication interface, one or more user interfaces that include displaying the one or more possible disposition options such that the person can view, modify, select, or approve disposition options.

Aspect 102. The storage medium of aspect 101, wherein the instructions, when executed by one or more processors, cause the system to: cause selected disposition options to be executed.

Aspect 103. The storage medium of aspect 101, wherein the instructions, when executed by one or more processors, cause the system to: obtain, from the person via a second XR environment, a death certificate for the deceased person to which the one or more assets belonged; and validate that the one or more assets can be disposed based upon the death certificate.

Aspect 104. The storage medium of aspect 101, wherein the estate data includes a plurality of asset records for respective ones of a plurality of assets associated with the second person, wherein one or more of the assets are dispensable upon death of the second person.

Aspect 105. The storage medium of aspect 104, wherein an asset data record for an asset includes data representing one or more of (i) the second person, (ii) a third-person associated with the asset, (iii) account information for the asset, (iv) policy information for the asset, (iv) one or more contractual terms for the asset, (v) a value of the asset, (vi) one or more beneficiaries, (vii) one or more legal executors, (viii) a description of the asset, (ix) an asset type, (x) one or more disposition options, or (xi) one or more dispositions of the asset.

Aspect 106. The storage medium of aspect 104, wherein an asset includes one of (i) an insurance policy, (ii) a bank account, (iii) an investment account, (iv) a savings account, (v) a checking account, (vi) a belonging, (vii) a business or stake in a business, (viii) an investment, (ix) a retirement savings account, (x) an annuity, or (xi) a property.

Aspect 107. The storage medium of aspect 101, wherein the instructions, when executed by one or more processors, cause the system to: update the estate data to include disposition records for selected disposition options; and cause the updated estate data to be stored on a distributed ledger.

Aspect 108. The storage medium of aspect 101, wherein obtaining the one or more XR preferences includes obtaining the one or more XR preferences from the person using one or more XR devices.

Aspect 109. The storage medium of aspect 101, wherein the one or more XR preferences represent one or more of profile data for the first person, virtual interaction preferences, metaverse preferences, or avatar preferences.

Aspect 110. The storage medium of aspect 101, wherein the instructions, when executed by one or more processors, cause the system to: provide, in another XR environment using another XR device associated with another person, one or more visual depictions of the estate data such that the other person can approve selected dispositions.

Aspect 111. The storage medium of aspect 101, wherein providing the one or more visual depictions of the one or more possible disposition options in the XR environment includes providing a virtual meeting of avatars of the person and another person via respective XR devices.

Aspect 112. The storage medium of aspect 101, wherein the XR device includes at least one of (i) an augmented reality (AR), mixed reality (MR), or virtual reality (VR) headset, or (ii) AR, MR, or VR smart glasses.

ADDITIONAL CONSIDERATIONS

The above description refers to block diagrams of the accompanying drawings. Alternative implementations of the examples represented by the block diagrams include one or more additional or alternative elements, processes, and/or devices. Additionally or alternatively, one or more of the example blocks of the diagrams may be combined, divided, re-arranged, or omitted. Components represented by the blocks of the diagrams may be implemented by hardware, software, firmware, and/or any combination of hardware, software, and/or firmware. In some embodiments, at least one of the components represented by the blocks may be implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines.

Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present).

Some exemplary logic circuits are hardware that executes machine-readable instructions to perform operations (e.g., one or more of the operations described herein and represented by the flowcharts of this disclosure, if such are present). Some exemplary logic circuits include a combination of specifically configured hardware and hardware that executes machine-readable instructions.

The above description refers to various operations described herein and flowcharts that may be appended hereto to illustrate the flow of those operations. Any such flowcharts are representative of example methods disclosed herein. In some embodiments, the methods represented by the flowcharts may implement the apparatuses represented by the block diagrams. Alternative implementations of example methods disclosed herein may include additional or alternative operations.

Further, operations of alternative implementations of the methods disclosed herein may combined, divided, re-arranged, or omitted. In some embodiments, the operations described herein may be implemented by machine-readable instructions (e.g., software and/or firmware) stored on a medium (e.g., a tangible machine-readable medium) for execution by one or more logic circuits (e.g., processor(s)). In some embodiments, the operations described herein may be implemented by one or more configurations of one or more specifically designed logic circuits (e.g., ASIC(s)). In some embodiments, the operations described herein may be implemented by a combination of specifically designed logic circuit(s) and machine-readable instructions stored on a medium (e.g., a tangible machine-readable medium) for execution by logic circuit(s).

Unless expressly stated to the contrary, "or" refers to an inclusive or and not to an exclusive or. For example, "A, B, or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media and/or virtual headsets, thereby making a computer program product, i.e., an article of manufacture, according to the discussed embodiments of the disclosure. The computer-readable media may be, for example, but is not limited to, a virtual headset or portion thereof, fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor or virtual headset, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to store and provide machine instructions and/or data to a programmable processor, including a machine-readable medium that receives machine instructions as a machine-readable signal. The "machine-readable medium" and "computer-readable medium," however, do not include transitory or propagating signals. The term "machine-readable signal" refers to any signal used to provide machine instructions and/or data to a programmable processor.

As used herein, a processor may include any programmable system including systems using virtual headsets and/or micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory for any suitable duration of time (e.g., permanently, for an extended period of time (e.g., while a program associated with the machine-readable instructions is executing), and/or a short period of time (e.g., while the machine-readable instructions are cached and/or during a buffering process)). The above memory types are examples only, and are thus not limiting as to the types of memory usable for storage of a computer program.

In one embodiment, a computer program is provided, and the program is embodied on a computer readable medium and/or virtual headset. In some embodiments, the system is executed on a single computer system or virtual headset, without requiring a connection to a server computer. In a further embodiment, the system is being run at least in part in a Windows® environment (Windows is a registered trademark of Microsoft Corporation, Redmond, Washington). In yet another embodiment, the system is run at least in part on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices, such as virtual headsets in wireless communication with one or more local or more processors or servers over one or more radio frequency links. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "exemplary embodiment," "one embodiment," or "some embodiments" of the present disclosure are not intended to be interpreted as excluding the existence of additional embodiments that also incorporate the recited features.

The patent claims at the end of this document are not intended to be construed under 35 U.S.C. § 113(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

While the preferred embodiments have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method for obtaining and using preference information, the method comprising:

presenting a first extended reality (XR) environment using a first XR device associated with a first person;

providing, in the first XR environment, one or more user interfaces to the first person;

receiving, from the first person via the one or more user interfaces in the first XR environment, one or more preferences of the first person;

predicting, based upon social media posts associated with the first person, a preferred virtual experience setting of the first person, wherein the preferred virtual experience setting of the first person includes a preferred virtual place in which a virtual meeting can occur;

generating a second XR environment in accordance with at least one of the one or more preferences and the preferred virtual experience setting of the first person; and presenting the second XR environment, using a second XR device, for a virtual meeting with an avatar of a second person.

2. The computer-implemented method of claim 1, wherein at least one of the one or more preferences includes one or more XR preferences, and the method further comprises:

generating the second XR environment in accordance with at least one of the one or more XR preferences.

3. The computer-implemented method of claim 2, wherein the one or more XR preferences include one or more metaverse preferences including one or more of a metaverse identifier or a preferred avatar, and wherein generating the second XR environment includes generating the second XR environment to represent a metaverse environment in accordance with the one or more metaverse preferences.

4. The computer-implemented method of claim 1, wherein at least one of the one or more preferences represents one or more of a virtual interaction preference, a preferred XR device, a preferred XR device type, an XR device identifier, or a willingness to hold virtual meetings.

5. The computer-implemented method of claim 1, wherein at least one of the one or more preferences represents one or more of personal data and social media data.

6. The computer-implemented method of claim 1, wherein the second XR device is the first XR device.

7. The computer-implemented method of claim 1, wherein the first XR device includes at least one of (i) an augmented reality (AR), mixed reality (MR), or virtual reality (VR) headset, (ii) AR, MR, or VR smart glasses, (iii) an audio input device configured to enable the first person to interact with a voice bot, or (iv) a text input device configured to enable the first person to interact with a chatbot.

8. A system for obtaining and using preference information, comprising:

a communication interface; and one or more processors configured to:

present a first extended reality (XR) environment using a first XR device associated with a first person;

provide, in the first XR environment via the communication interface, one or more user interfaces to the first person;

receive, from the first person via the one or more user interfaces in the first XR environment via the communication interface, one or more preferences of the first person;

predict, based upon social media posts associated with the first person, a preferred virtual experience setting of the first person, wherein the preferred virtual experience setting of the first person includes a preferred virtual place in which a virtual meeting can occur;

generate a second XR environment in accordance with at least one of the one or more preferences and the preferred virtual experience setting of the first person; and present the second XR environment, using a second XR device, for a virtual meeting with an avatar of a second person.

9. The system of claim 8, wherein at least one of the one or more preferences includes one or more XR preferences, and the one or more processors are configured to:

generate the second XR environment in accordance with at least one of the one or more XR preferences.

10. The system of claim 9, wherein the one or more XR preferences include one or more metaverse preferences including one or more of a metaverse identifier, or a preferred avatar, and wherein generating the second XR environment includes generating the second XR environment to represent a metaverse environment in accordance with the one or more metaverse preferences.

11. The system of claim 8, wherein at least one of the one or more preferences represents one or more of a virtual interaction preference, a preferred XR device, a preferred XR device type, an XR device identifier, or a willingness to hold virtual meetings.

12. The system of claim 8, wherein at least one of the one or more preferences represents one or more of personal data and social media data.

13. The system of claim 8, wherein the second XR device is the first XR device.

14. A non-transitory computer-readable storage medium for obtaining and using preference information, the storage medium storing instructions that, when executed by one or more processors, cause a system to:

present a first extended reality (XR) environment using a first XR device associated with a first person;

provide, in the first XR environment, one or more user interfaces to the first person;

receive, from the first person via the one or more user interfaces in the first XR environment, one or more preferences of the first person;

predict, based upon social media posts associated with the first person, a preferred virtual experience setting of the first person, wherein the preferred virtual experience setting of the first person includes a preferred virtual place in which a virtual meeting can occur;

generate a second XR environment in accordance with at least one of the one or more preferences and the preferred virtual experience setting of the first person; and present the second XR environment, using a second XR device, for a virtual meeting with an avatar of a second person.

15. The storage medium of claim 14, wherein at least one of the one or more preferences includes one or more XR preferences, and the instructions, when executed by the one or more processors, cause the system to:

generate the second XR environment in accordance with at least one of the one or more XR preferences.

* * * * *